(12) United States Patent
Powers et al.

(10) Patent No.: US 8,047,751 B2
(45) Date of Patent: Nov. 1, 2011

(54) WHEEL CHOCK WITH RESTRAINT

(75) Inventors: Joseph R. Powers, Broadview Heights, OH (US); Thomas R. Wiatrak, Brunswick, OH (US); Frederick J. Diamond, Warren, OH (US)

(73) Assignee: Midwest Precision Products, Inc., North Royalton, OH (US)

( * ) Notice: Subject to any disclaimer, the term of this patent is extended or adjusted under 35 U.S.C. 154(b) by 470 days.

(21) Appl. No.: 12/180,022

(22) Filed: Jul. 25, 2008

(65) Prior Publication Data
US 2009/0035088 A1 Feb. 5, 2009

Related U.S. Application Data

(60) Provisional application No. 60/952,981, filed on Jul. 31, 2007, provisional application No. 60/968,595, filed on Aug. 29, 2007, provisional application No. 61/065,180, filed on Feb. 8, 2008.

(51) Int. Cl.
*B60P 7/08* (2006.01)

(52) U.S. Cl. .......... 410/20; 410/7; 410/10; 410/12; 410/23; 410/30

(58) Field of Classification Search ............. 410/7, 9, 410/19, 30, 49, 10, 11, 12, 20, 21, 23, 50, 410/97, 100; 188/32; 248/499
See application file for complete search history.

(56) References Cited

U.S. PATENT DOCUMENTS

| | | | |
|---|---|---|---|
| 4,786,223 A | 11/1988 | Crissy | |
| 5,011,347 A | 4/1991 | Bullock | |
| 5,037,255 A | 8/1991 | Bullock | |
| 5,302,063 A | 4/1994 | Winsor | |
| 5,312,213 A | 5/1994 | Winsor | |
| 5,316,421 A | 5/1994 | Bullock | |
| 7,632,052 B2 * | 12/2009 | Tatina | 410/20 |

* cited by examiner

*Primary Examiner* — Stephen Gordon
(74) *Attorney, Agent, or Firm* — Kane Kessler, P.C.; Paul E. Szabo

(57) ABSTRACT

A wheel chock for restraining movement of a vehicle tire on a supporting grating during transit includes a base, a grate lock mechanism for locking the base to the grating, and a ramp on the base for engagement with a circumference of a vehicle tire. A strap connected with the base is extensible around the vehicle tire to help restrain movement of the tire on the grating. The chock includes a retractor for retracting the strap and for taking up slack that forms in the strap during transit.

9 Claims, 19 Drawing Sheets

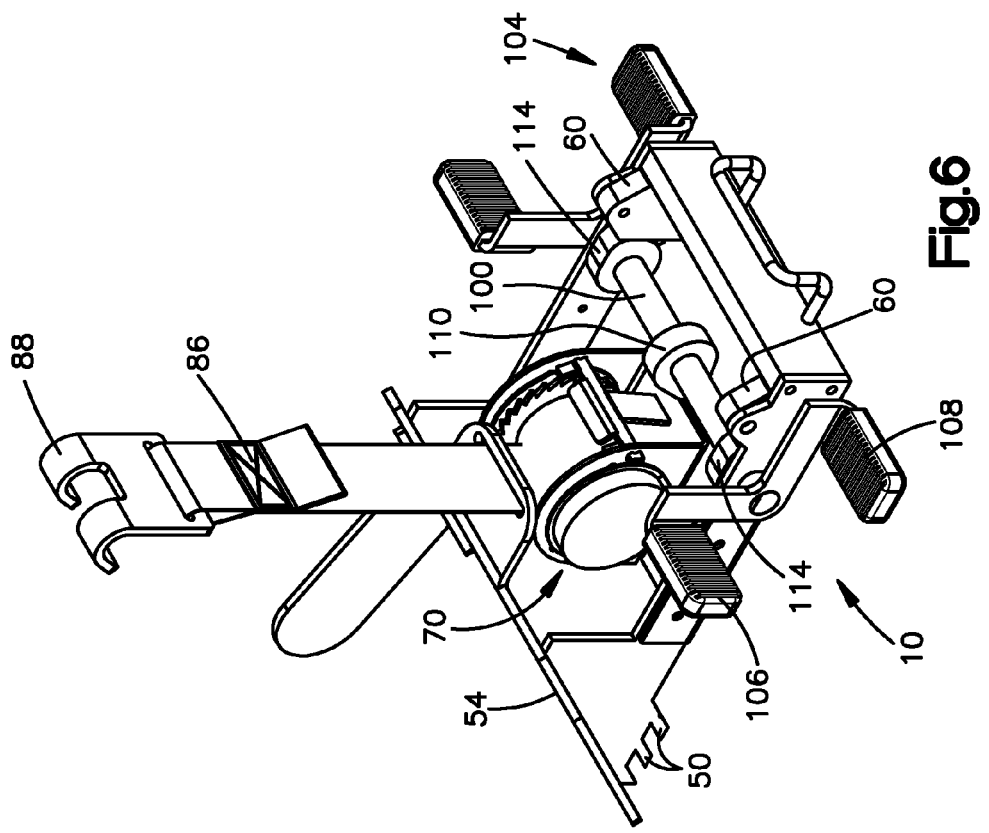
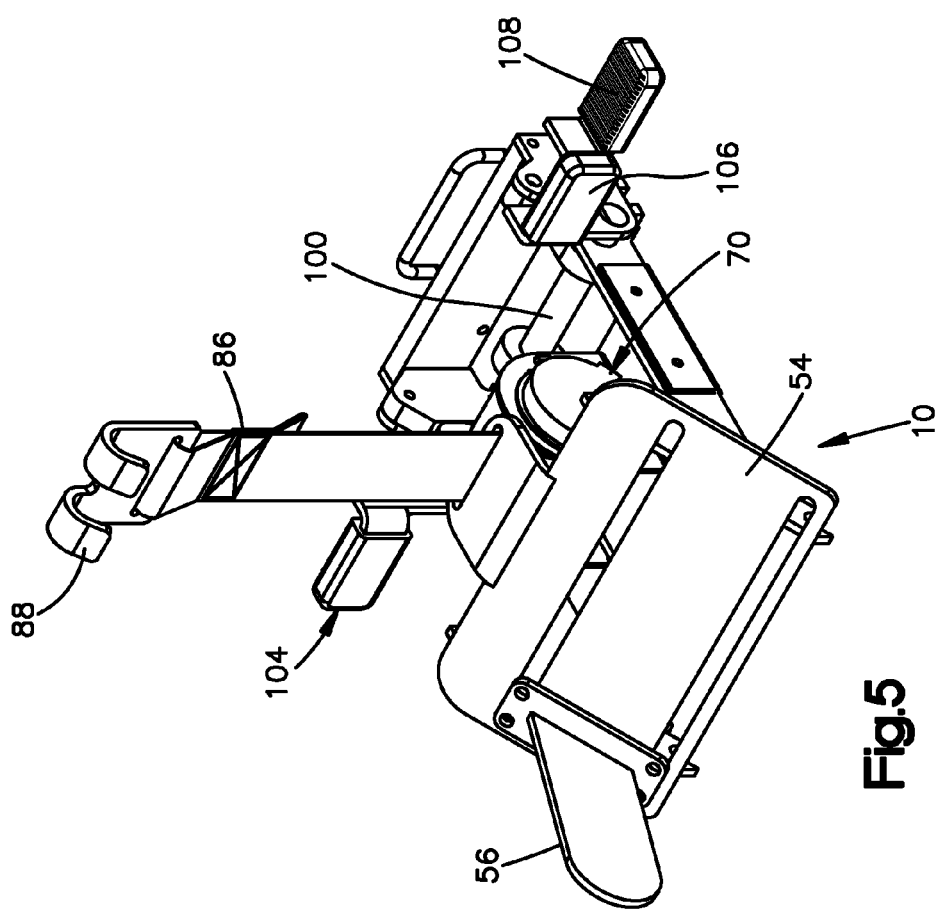

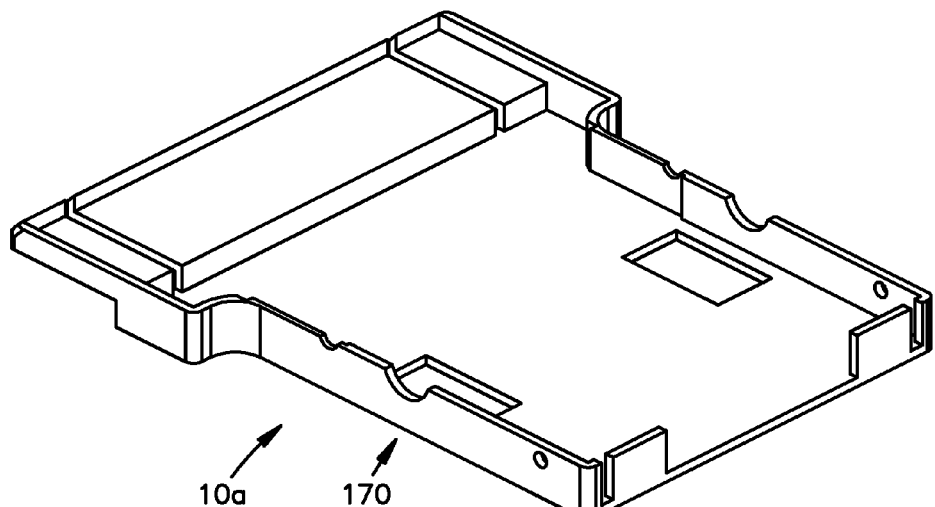
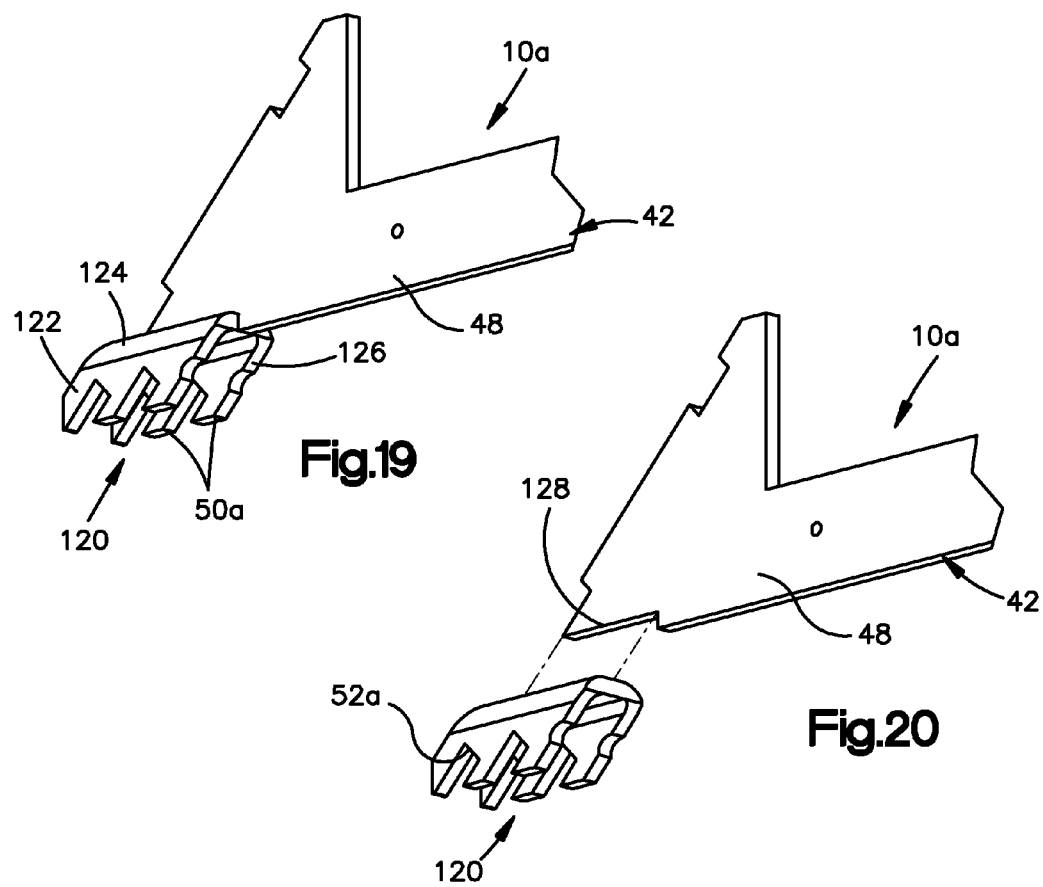

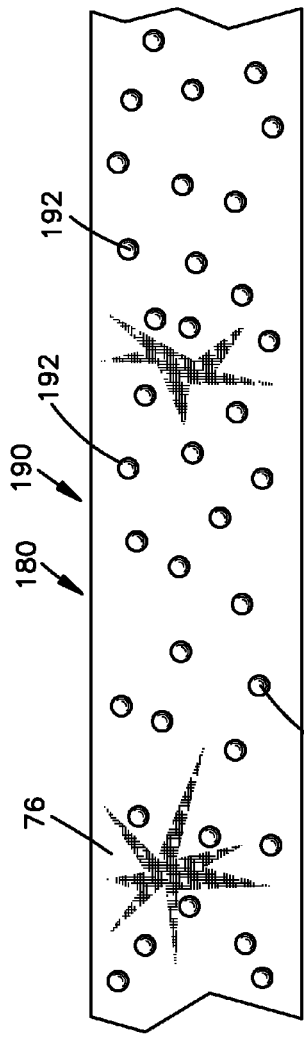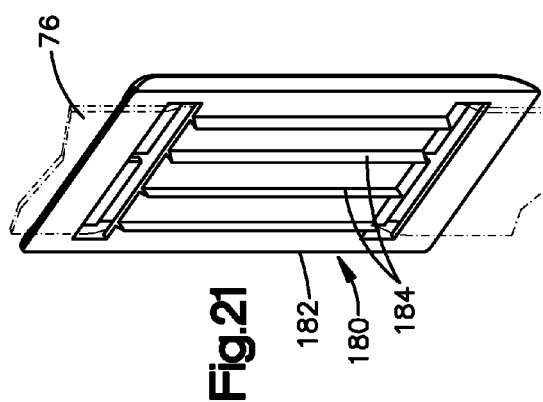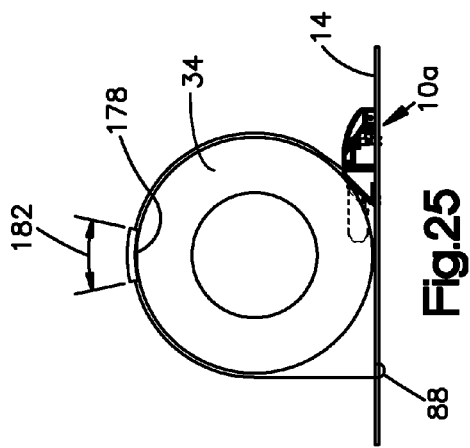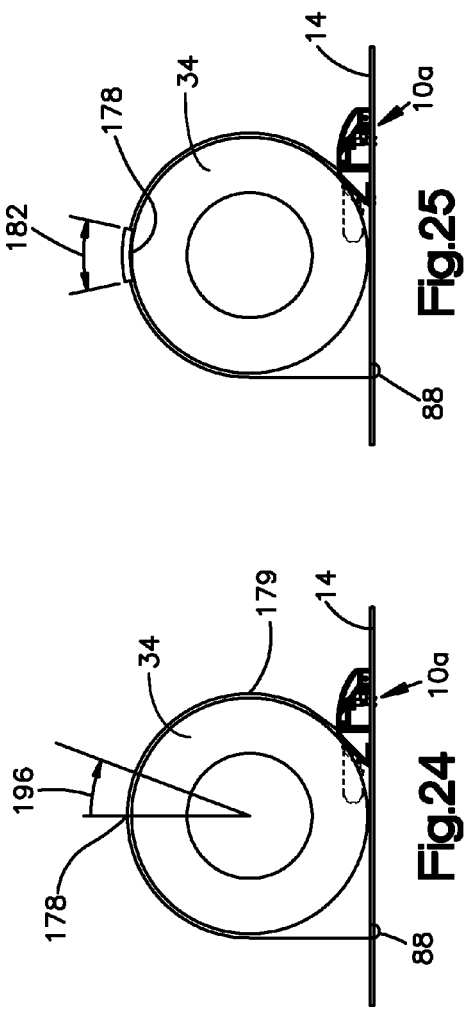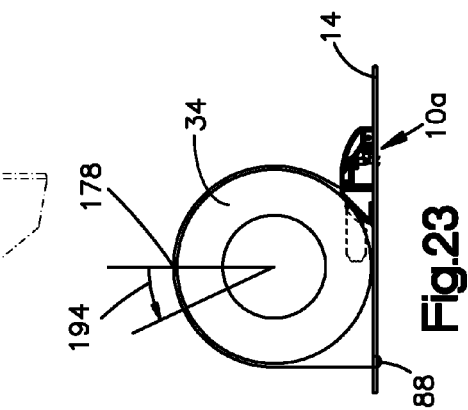

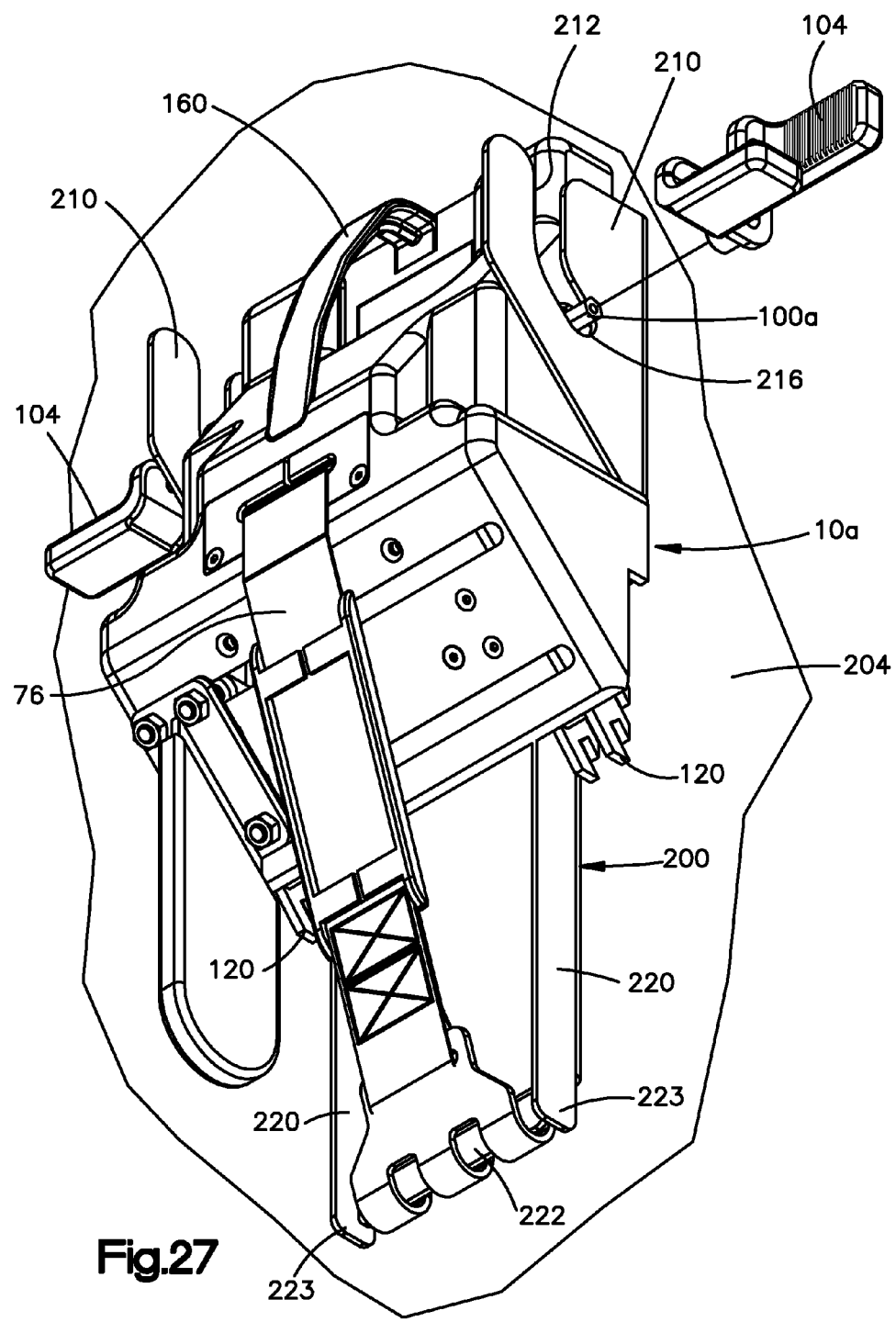

US 8,047,751 B2

WHEEL CHOCK WITH RESTRAINT

RELATED APPLICATIONS

This application claims the benefit under 35 U.S.C. 119(e) of U.S. Provisional Application No. 60/952,981 filed Jul. 31, 2007; and of U.S. Provisional Application No. 60/968,595, filed Aug. 29, 2007; and of U.S. Provisional Application No. 61/065,180 filed Feb. 8, 2008. The disclosures of all of these applications are incorporated by reference.

BACKGROUND OF THE INVENTION

The invention relates to a wheel chock, used for example in helping to hold an automobile in position in a railroad car during transportation of the automobile by train (in transit). The invention also relates to a wall mount for a wheel chock, and to a system that includes both the wall mount and the wheel chock.

U.S. Pat. Nos. 5,312,213 and 5,302,063 disclose a wheel chock system for such an application. The system resists fore-and-aft vehicle movement with angled ramps, and also resists lateral vehicle movement, but does not prevent upward movement of the vehicle. Thus, when a significant fore-and-aft impact force is applied, for example when two railroad cars are being coupled, the automobiles can ride up over the ramps, causing damage. The disclosure of these two patents is incorporated by reference.

BRIEF DESCRIPTION OF THE DRAWINGS

Features of the invention will become apparent to one of ordinary skill in the art upon reading the following specification, together with the accompanying drawings, in which:

FIG. 5 is a perspective view of the wheel chock of FIG. 2 shown without its housing;

FIG. 6 is another perspective view similar to FIG. 5;

FIG. 15A is an enlarged sectional view of a portion of the wheel chock of FIG. 13;

FIG. 18 is a perspective view of a bottom cover that forms part of the wheel chock of FIG. 13;

FIGS. 19 and 20 show steps in assembling a front tooth portion of the wheel chock of FIG. 13;

FIG. 21 illustrates a slidable grip that forms part of the wheel chock of FIG. 13;

FIG. 22 illustrates another embodiment of a wheel chock grip;

FIGS. 23-25 are schematic views showing steps in the process of locating a grip on a restraint portion of the wheel chock;

FIG. 27 is a perspective view illustrating a wall plate supporting the wheel chock.

DETAILED DESCRIPTION

Figure 1:
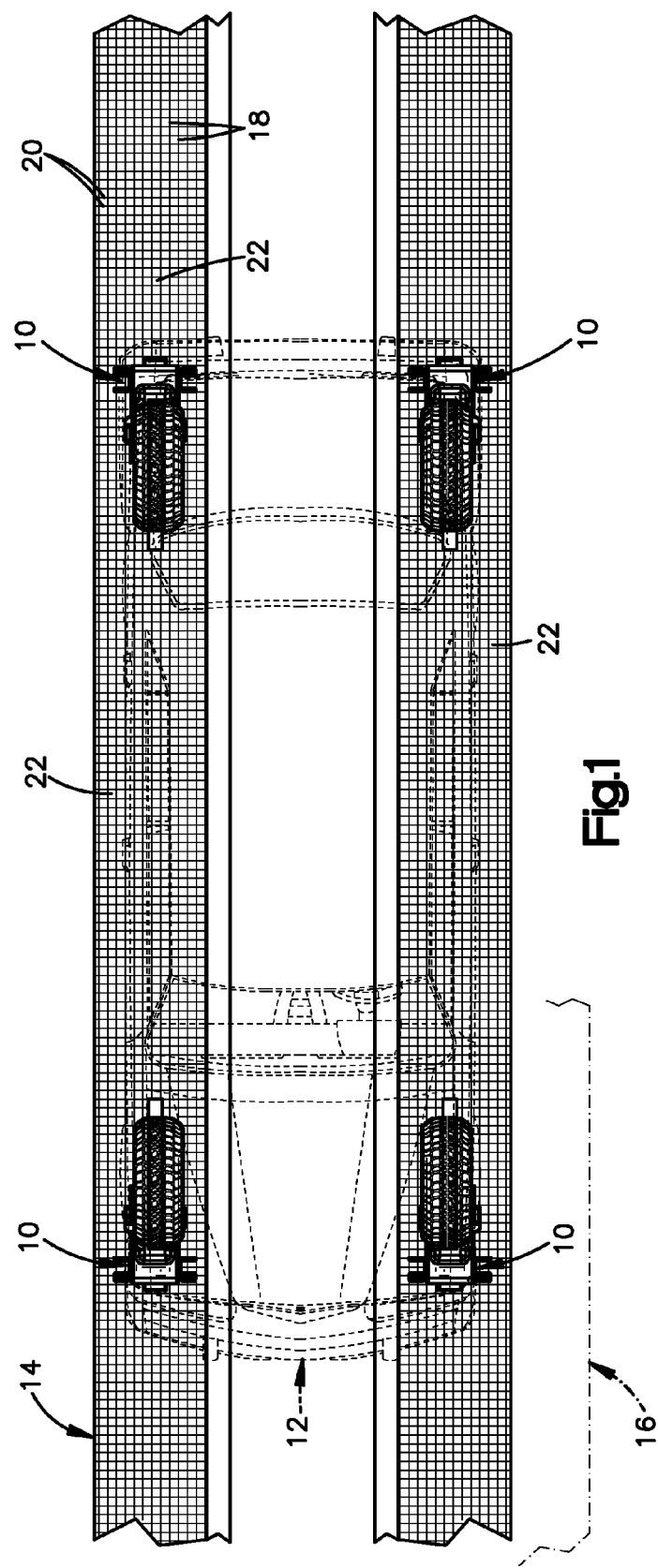
FIG. 1 is a schematic top plan illustration of a vehicle on a grating secured by a plurality of wheel chocks of the present invention.

The present invention relates to a wheel chock and a system including a wheel chock. The invention is applicable to wheel chocks of varying different constructions. As representative of the invention, FIG. 1 illustrates the use of one or more wheel chocks 10 in positioning of a vehicle 12, for example a car, on a grating 14 of a railroad car 16. The grating 14 has longitudinally extending wires 18 and transversely extending cross wires 20 that together define a plurality of square openings 22 in the grating. The front of the car 12 is to the left as viewed in FIG. 1. Four wheel chocks 10 of the present invention are shown holding the car 12 in place on the grating 14, one at each wheel of the car. The two front chocks 10 are positioned adjacent to the front tires to resist movement of the vehicle 12 relative to the grating 14, as described below; the two rear chocks are positioned adjacent to the rear tires to resist movement of the vehicle relative to the grating, as described below.

The chock 10 (FIGS. 4-7) has a front end designated generally by the arrow 30 (FIG. 7) and a back end designated generally by the arrow 32. The front end 30 (as that term is used herein) is the end that goes up against the vehicle tire 34 (FIGS. 2 and 3) (whether the chock is at a front tire or a rear tire). For reference, the drawings also show a front to back axis 36 of the chock 10.

The chock 10 includes a base 40. The base 40 includes first and second cleats 42 that extend front to back, and an end plate 46 that joins the back ends of the cleats.

Each cleat 42 has a main body portion 48 from which extend a set of front teeth 50. The front teeth 50 extend downwardly and forwardly adjacent the front end of the base 40. Each front tooth 50 has a generally parallelogram-shaped configuration. The front teeth 50 are separated at their upper ends by a straight edge 52 (FIG. 4) of the main body portion 48 of the cleat.

In the illustrated embodiment, each set of front teeth 50 includes two teeth spaced apart in a front to back direction by a distance selected so that the two teeth fit within one opening 22 of the grating 14. More or fewer teeth 50 can be provided, and at different locations; for example, several side by side pairs of teeth can be provided on each side of the chock 10.

The first and second cleats 42 are spaced apart laterally by a distance that is selected so that, when the chock 10 is engaged with the grating 14, the two cleats are just on the outsides of parallel longitudinal wires 18 of the grating. As a result, the front teeth 50 help to resist lateral movement of the chock 10 on the grating 14, as well as fore and aft movement of the chock on the grating.

A ramp 54 is fixed to the base 40 at the front end of the base. The ramp 54 extends between and interconnects the front ends of the cleats 42. The ramp 54 extends at an angle so as to be locatable under a tire 34 of a vehicle to be transported. The ramp 54 may be part of the base 40 if desired.

The chock 10 also includes a lateral restraint 56 adjacent the base. The lateral restraint 56 may, as shown in the illustrated embodiment, be slidably mounted on the ramp 54 for movement between opposite sides of the ramp and thus between opposite sides of the chock. This helps enable the chock 10a to be used on any one of the four tires of the vehicle 12, for example as shown in FIG. 1. The lateral restraint may alternatively be mounted on the base 40.

A plurality of grate locks 60 are supported on the base 40 for pivotal movement relative to the base. The grate locks 60 are pivotally mounted on the main body portions 48 of the cleats 42, just inside the cleats. Each grate lock 60 has two rearwardly extending hooks 62 spaced apart in a front to back direction by a distance selected so that both hooks can fit within one opening 22 of the grating 14. In the illustrated embodiment, two grate locks 60 are shown; more than two grate locks could be used, for example two or three per side.

Figure 7:
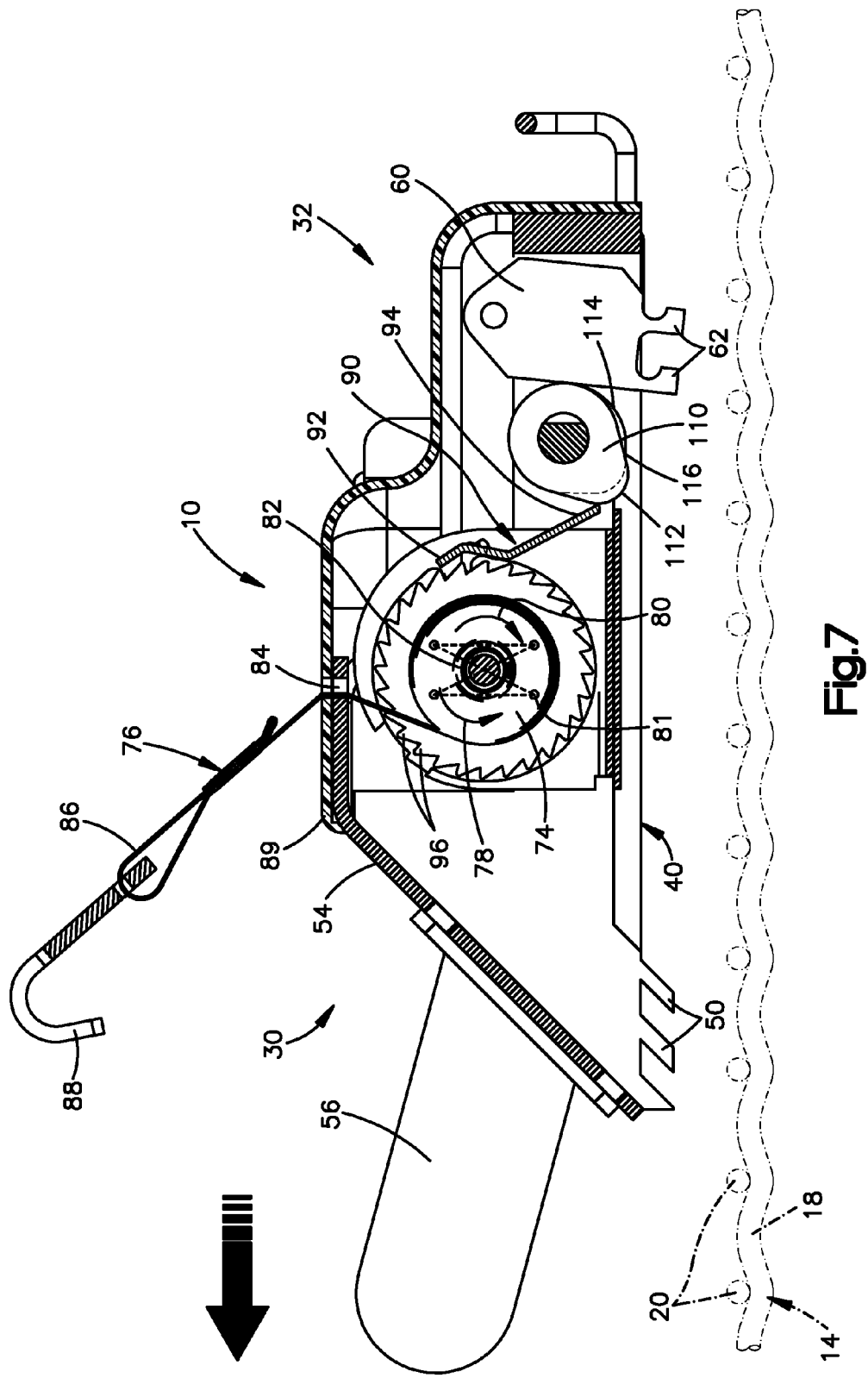
FIGS. 7-11 are side sectional views of the wheel chock of FIG. 2, showing steps in the process of mounting the wheel chock on the grating.
Figure 8:
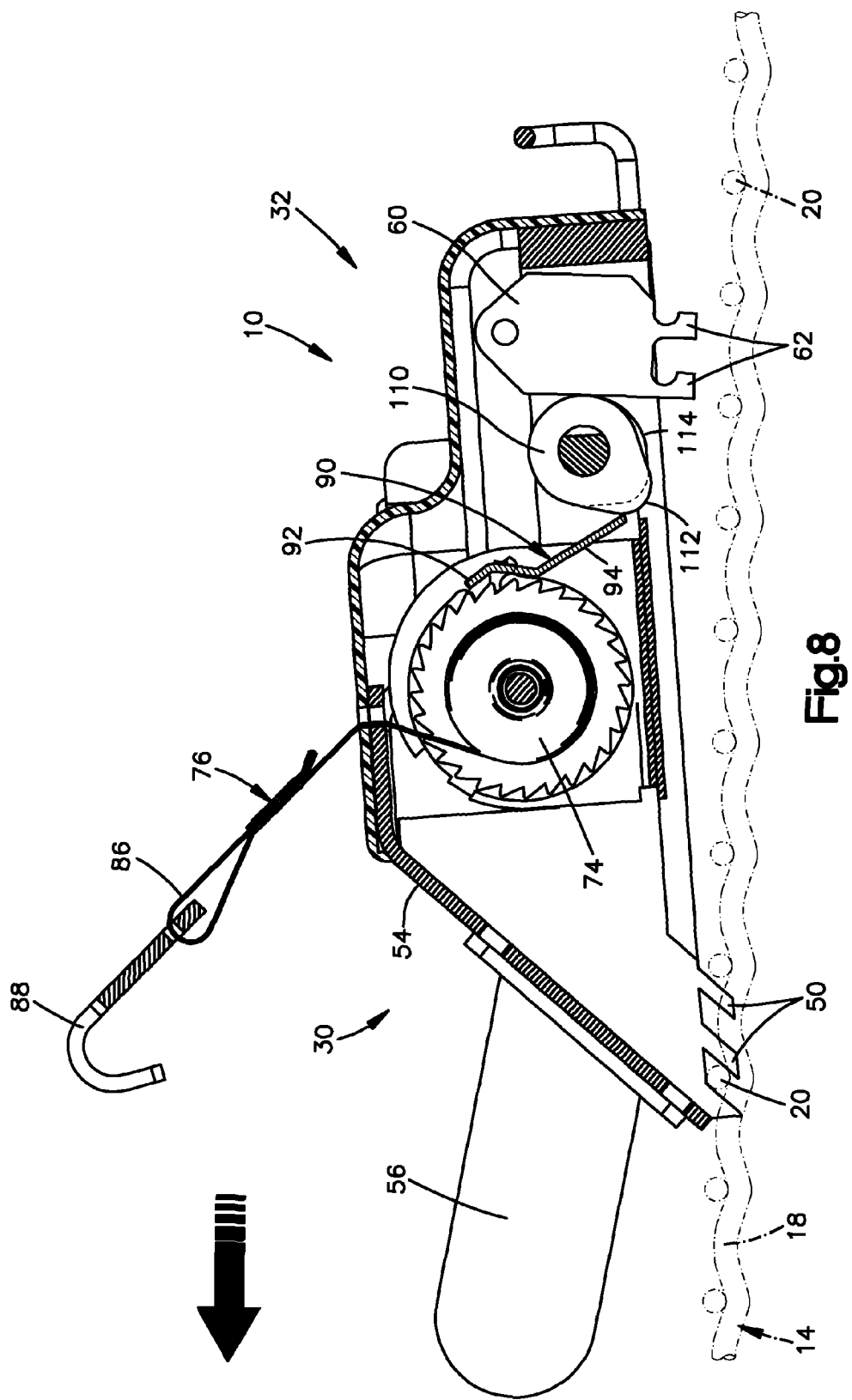
Figure 9:
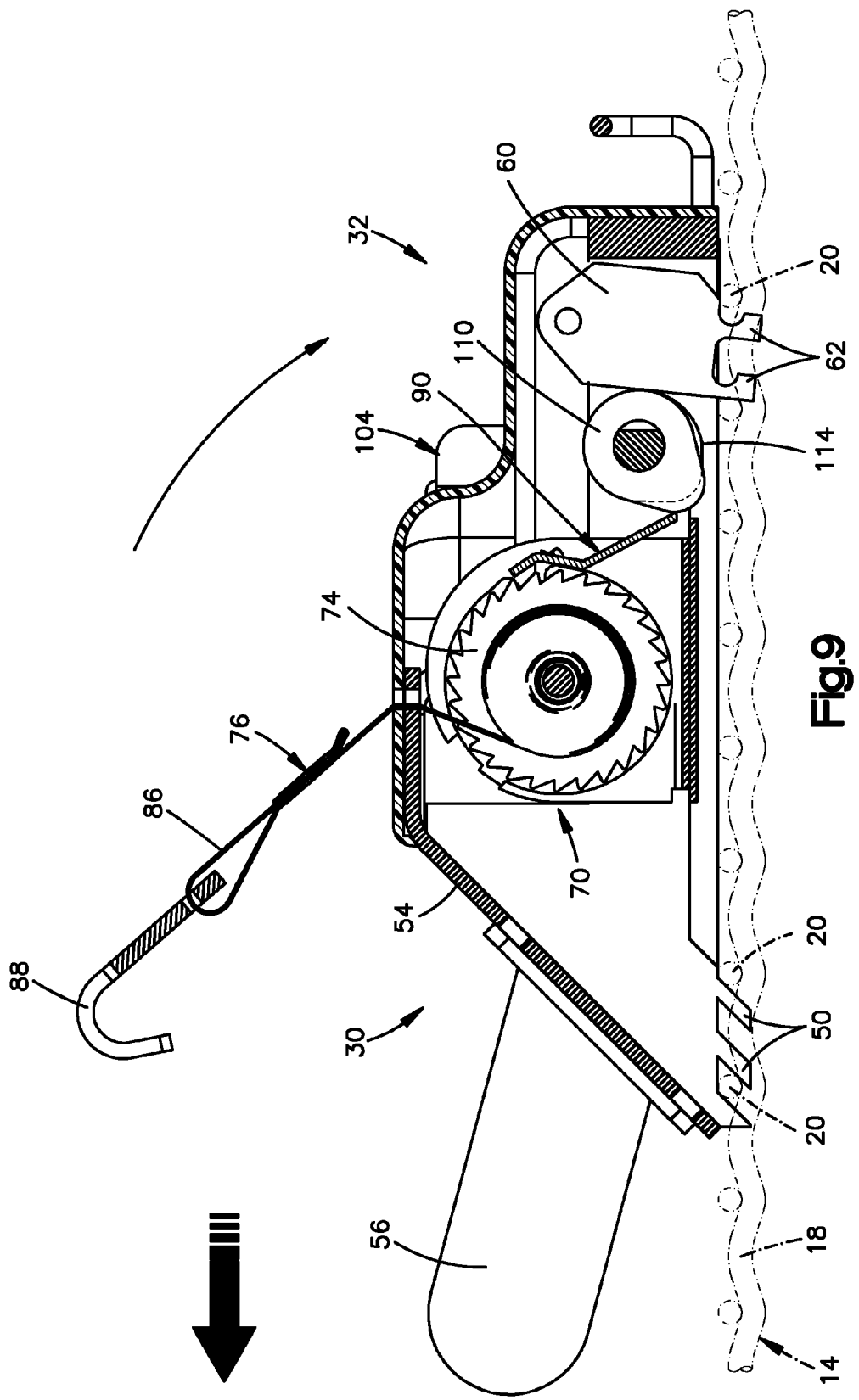
Figure 10:
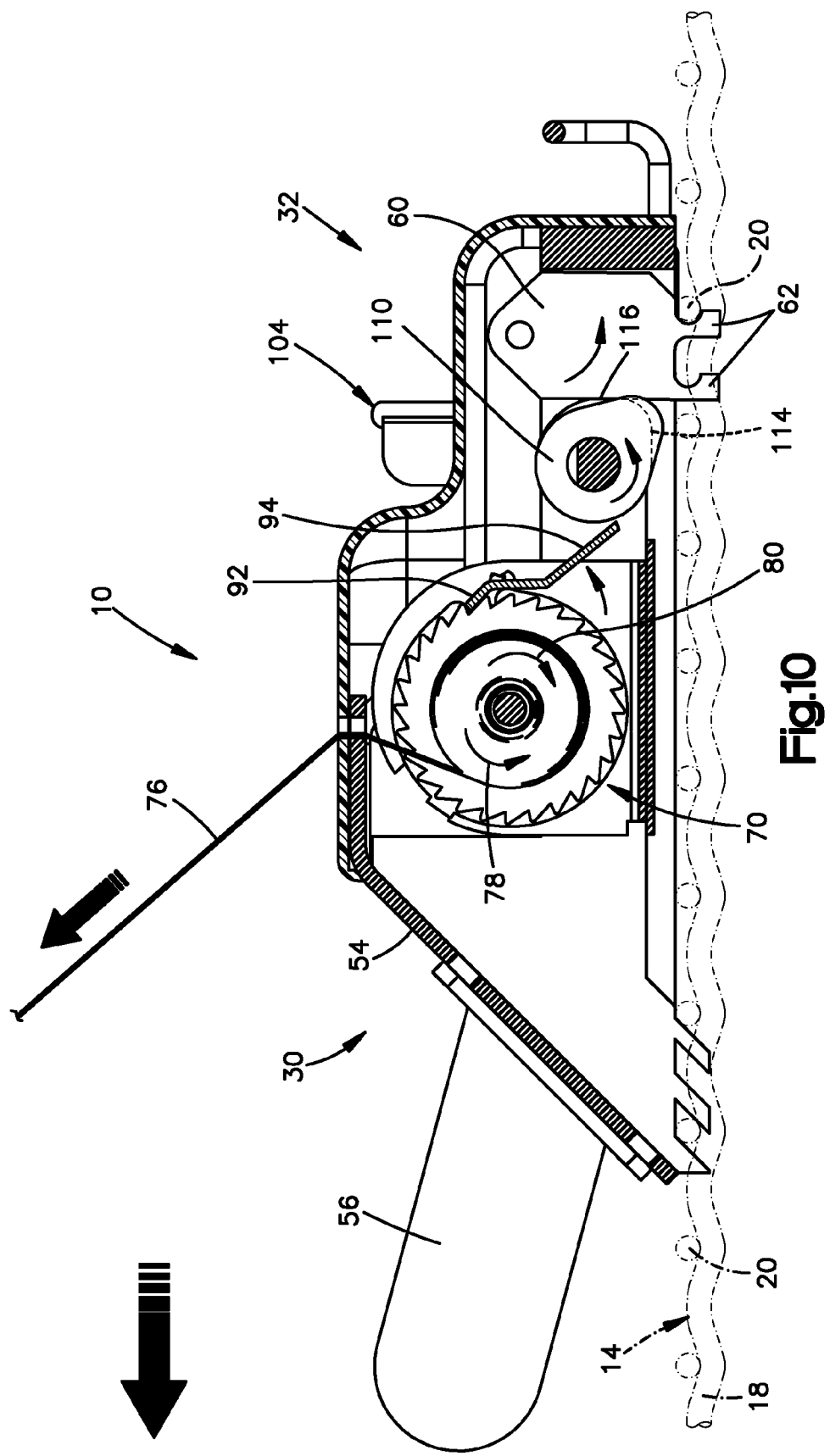

The grate locks 60 are movable between a first or unlocked position, for example as shown in FIGS. 7-9, in which the hooks 62 of each grate lock do not extend under a cross-wire 20 of the grating 14; and a second or locked position, for example as shown in FIG. 10, in which one of the two hooks of each grate lock extends rearward under a cross-wire of the grating to help to lock the chock 10 to the grating. Each grate lock 60 is biased into the unlocked position by a spring or other means for example as shown at 64.

A retractor 70 is supported on the base 40. The retractor 70 includes a retractor frame 72. The frame 72 supports a spool 74 on which a strap 76 is wound. The spool 74 is rotatable in opposite strap retraction and strap withdrawal directions 78 and 80. The spool 74 is biased for rotation in the strap retraction direction 78 by a spring shown schematically at 81 that acts always on the spool and that thus acts always on the strap. A first end 82 of the strap 76 is secured to the spool 74.

The strap 76 extends upward from the spool 74, through a strap guide 84 extending from the top of the ramp 54. A second or terminal end 86 of the strap 76 includes a hook 88 that is adapted to be hooked around a cross-wire 20 of the grating 14, as described below. A cover 89 may be provided for the chock 10, through which the strap 76 extends.

The retractor 70 includes a pivotally mounted lever 90. The lever 90 includes a locking pawl 92 above the pivot point of the lever, and an engageable actuating portion 94 below the pivot point. The lever 90 is movable between a first or unlocked position, for example as shown in FIG. 7, in which the locking pawl 92 does not engage ratchet teeth 96 on the spool 74 to block rotation of the spool in the strap withdrawal direction 80; and a second or locked position, for example as shown in FIG. 10, in which the locking pawl engages the ratchet teeth on the spool to block rotation of the spool in the strap withdrawal direction. The lever 90 may be biased into the locking position by a spring or other means (not shown). The retractor 70 may also include other items (not shown) such as a clutch, for example, and the lever 90 may be positionable by the clutch and/or by the amount of strap 76 that is wound on the spool 74 at any given time, for example. In any event, the strap is always under tension because the spool 74 is always biased for rotation in the retraction direction 78 by the retractor spring 81, whether or not the locking pawl is engaged.

A shaft 100 is supported on the base 40 for rotation relative to the base about a shaft axis 102. The shaft axis 102 extends generally perpendicular to the front-to-back axis 36 of the base 40.

First and second paddles 104 are mounted at the ends of the shaft 100. The paddles 104 are either foot operated or hand operated. Each paddle 104 has a generally L-shaped configuration including a first or red arm 106 and a second or green arm 108 at 90° from the first arm. The arms 106 and 108 are color-coded to show at a glance the locked or unlocked condition of the chock 10, as described below. The shaft 100 is rotatable through a 90° range of motion about the shaft axis 102 so that one or the other of the arms 106 and 108 is upright. Because there is a paddle 104 on either end of the shaft 100, and because the lateral restraint 56 can be positioned at either side, the chock 10 can be used on any one of the four tires of the vehicle 12, for example as shown in FIG. 1.

A plurality of cams are fixedly mounted on the shaft 100 for rotation with the shaft. The cams thus are actuatable (rotatable or pivotable) upon turning of the paddles 104.

Specifically, a center cam or retractor cam 110 is mounted on the shaft 100 adjacent the actuating portion 94 of the retractor lever 90. The retractor cam 110 has a projecting lobe 112. The retractor cam 110 is pivotable as described below between a first position, for example as shown in FIG. 7, in which the locking pawl 92 of the retractor lever 90 does not block rotation of the spool 74 in the strap withdrawal direction 80; and a second position, for example as shown in FIG. 10, in which the cam 110 cooperates with the locking pawl to block rotation of the spool in the strap withdrawal direction.

In addition, a pair of side cams 114 are mounted on the shaft 100 adjacent the grate locks 60. Each side cam 114 has a flat spot 116. The side cams 114 are pivotable as described below between a first position, for example as shown in FIG. 7, in which the side cams do not cause the grate locks 60 to move into their engaged position, and a second position, for example as shown in FIG. 10, in which the side cams cause the grate locks to move into their engaged position with the grating 14. A spring (not shown) biases the grate locks into their unlocked position.

FIG. 7 illustrates the chock 10 in the unlocked position, disposed above the grating 14 and ready to be moved down into engagement with the grating. The red arms 106 of the paddles 104 are up, showing that the grate locks 60 are in their unlocked position. The strap 76 is wound on the spool 74, which is rotatable in the strap withdrawal direction 78. The pawl 92 of the retractor lever 90 is out of engagement with the ratchet teeth 96 of the spool 74.

A position of the chock 10 on the grating 14 is then selected so that the ramp 54 is under the tire, while the lateral restraint 56, when slid fully sideways on the chock (FIG. 3), is on the sidewall of the tire. FIG. 8 illustrates movement of the front end of the chock 10 into such a position in engagement with the grating 14. The front teeth 50 engage a cross wire 20 of the grating 14. Specifically, at least one front tooth 50 on each side of the chock 10 slides forward and under the cross wire 20 to help to position and lock the front end of the chock onto the grating 14.

The back end of the chock 10 is then moved down into engagement with the grating 14, as shown in FIG. 9. Specifically, the back end of the base 40 is pivoted down onto the grating 14. The positioning of the grate locks 60 on the base 40 is such that the hooks 62 of the grate locks extend into openings 22 of the grating. Because the grate locks 60 are in their unlocked position, the hooks 62 do not extend under any cross-wires 20 of the grating 14. The condition of the retractor 70 has not changed.

Figure 2:
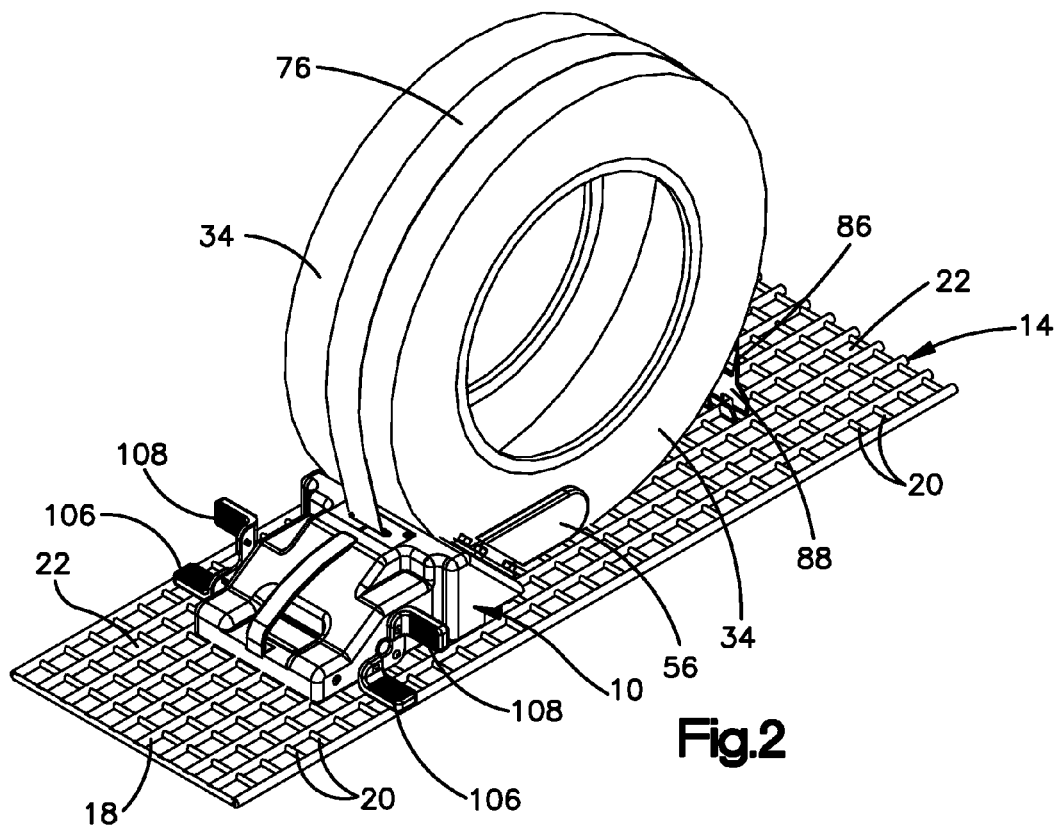
FIG. 2 is a front perspective view of a wheel chock that is a first embodiment of the present invention, shown in position restraining a vehicle wheel on a grating.
Figure 3:
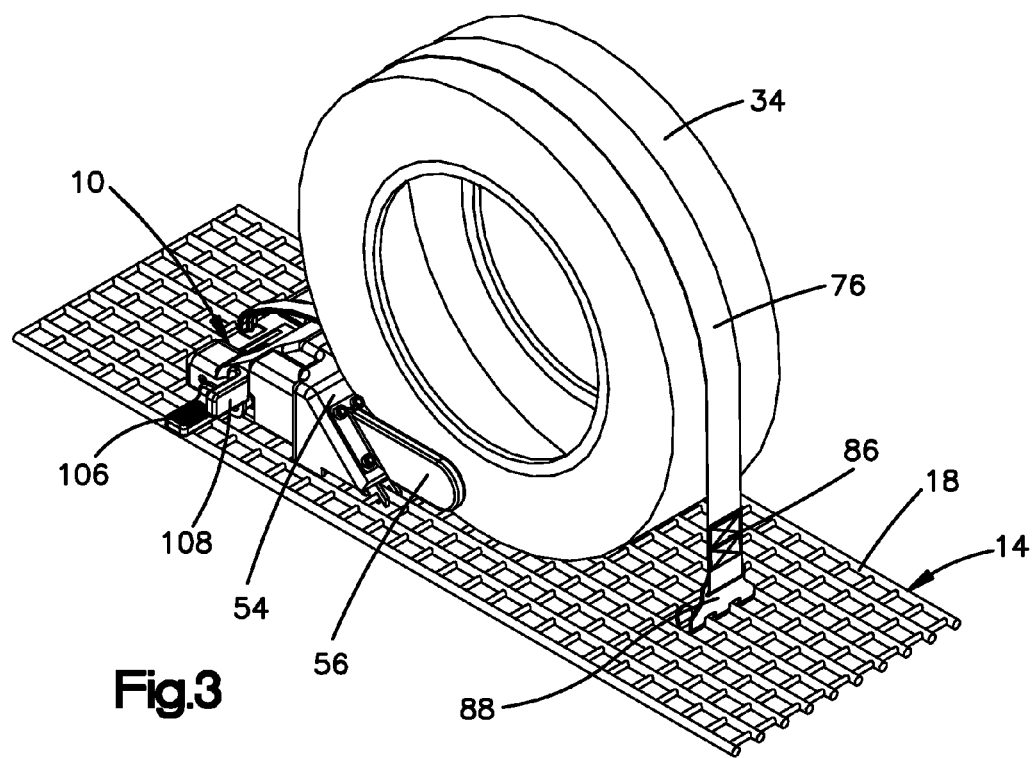
FIG. 3 is a rear perspective view similar to FIG. 2.
Figure 4:
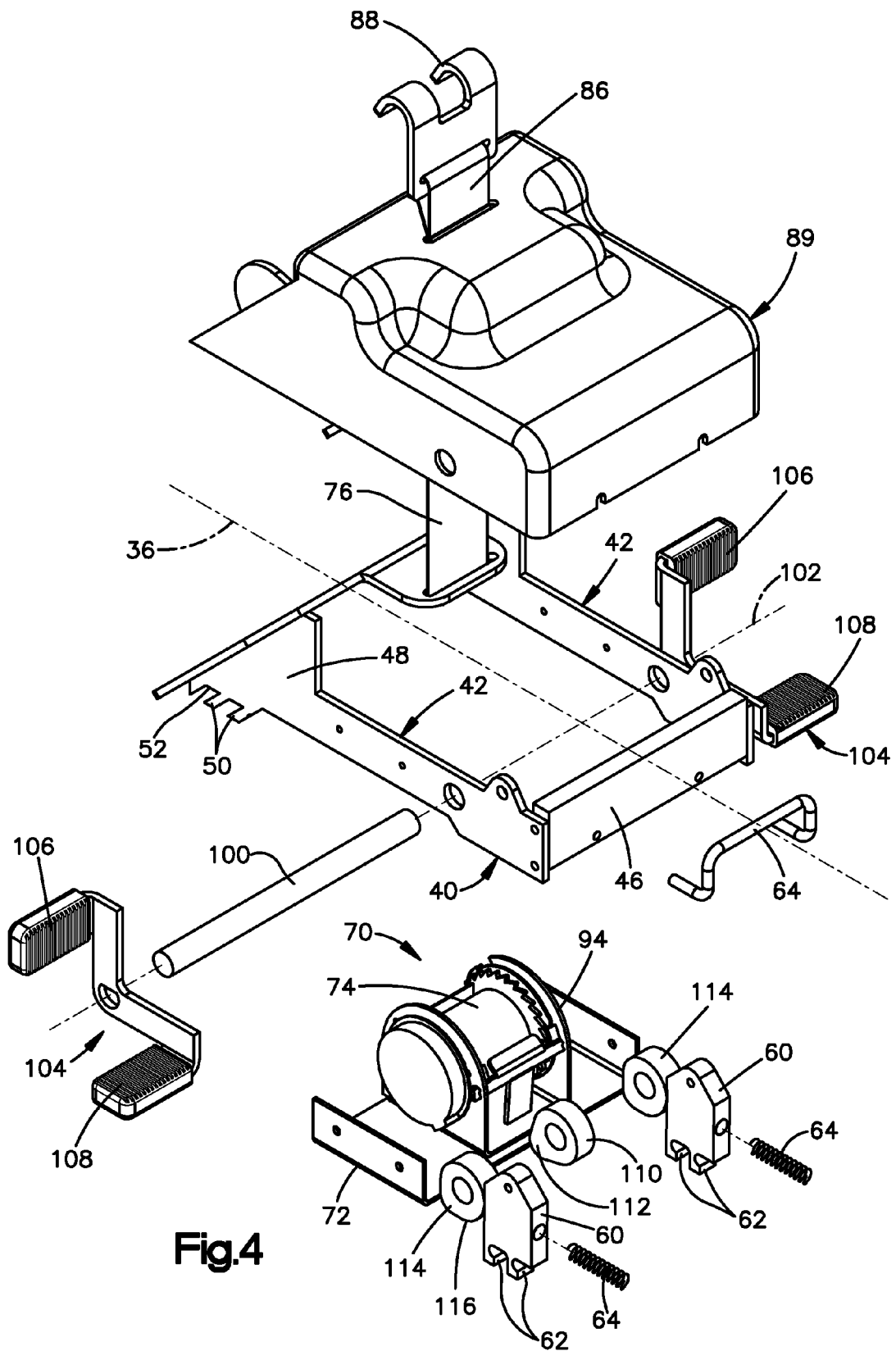
FIG. 4 is an exploded perspective view of the wheel chock of FIG. 2.

Next, the operator extends the strap 76 of the retractor 70 over the associated vehicle tire 34, as shown in FIGS. 2 and 3. The operator can grasp the terminal end 86 of the strap 76 and pull it out far enough to extend over the vehicle tire 34. The operator engages the hook 88 with the grating 14 on the side of the tire 34 opposite the chock 10. When the strap 76 is thereafter released, the spool 74 rotates in the strap retraction direction 78, and slack in the strap is taken up by the retractor 70.

Next, the chock 10 is locked to the grating 14, as shown in FIG. 10. The operator turns the paddles 104 by 90° (in a counter-clockwise direction as viewed in FIG. 10). As a result, the shaft 100 turns in that same direction, carrying with it the retractor cam 110 and the side cams 114. The green arms 108 of the paddles 104 move to the up position, indicating a locked condition of the chock 10.

When the side cams 114 turn, they pivot from the position shown in FIGS. 7-9 to the position shown in FIG. 10. The flat 116 on each side cam 114 engages the associated grate lock 60 and causes the grate lock to pivot to the engaged, or locked, position shown in FIG. 10. In this position, the hooks 62 on the grate locks 60 extend rearward beneath the cross-wire 20 of the grating 14, thus helping to position and lock the back end of the chock 10 to the grating.

At the same time, the retractor cam 110 turns to a position as shown in FIG. 10. In this position, the retractor cam 110 can not hold the pawl 92 of the retractor lever 90 out of engagement with the ratchet teeth 96 of the spool 74.

When this operation is completed, the pawl 92 of the retractor lever 90 is in engagement with the ratchet teeth 96, blocking rotation of the spool in the strap withdrawal direction 80. As a result, the strap 76 is held tight around the vehicle tire 34. If the strap 76 elongates slightly or the vehicle shifts during transport, the strap will continue to be held tightly around the vehicle tire 34 since the retractor spring 81 will, by design, continue to take up any slack that is created during transit. Because the first end 82 of the strap 76 is locked to the grating 14 at a location behind and close to the tire 34 (at the retractor 70), and the second end 86 of the strap is locked to the grating at a location in front of and close to the tire (at the terminal end 86), the strap holds the tire down on the grating. The chock 20 including the strap 76 thus minimizes vertical movement of the vehicle 12 and possible riding of the vehicle up over the chocks during transit, that is, during movement of the railroad car. In addition, the strap 76 helps to resist forward or backward movement of the tire 34 along the grating 14. As a result, the vehicle 12 is held to the grating 14 in a significantly more secure manner than it would be if the retractor 70 and strap 76 were not provided.

Figure 11:
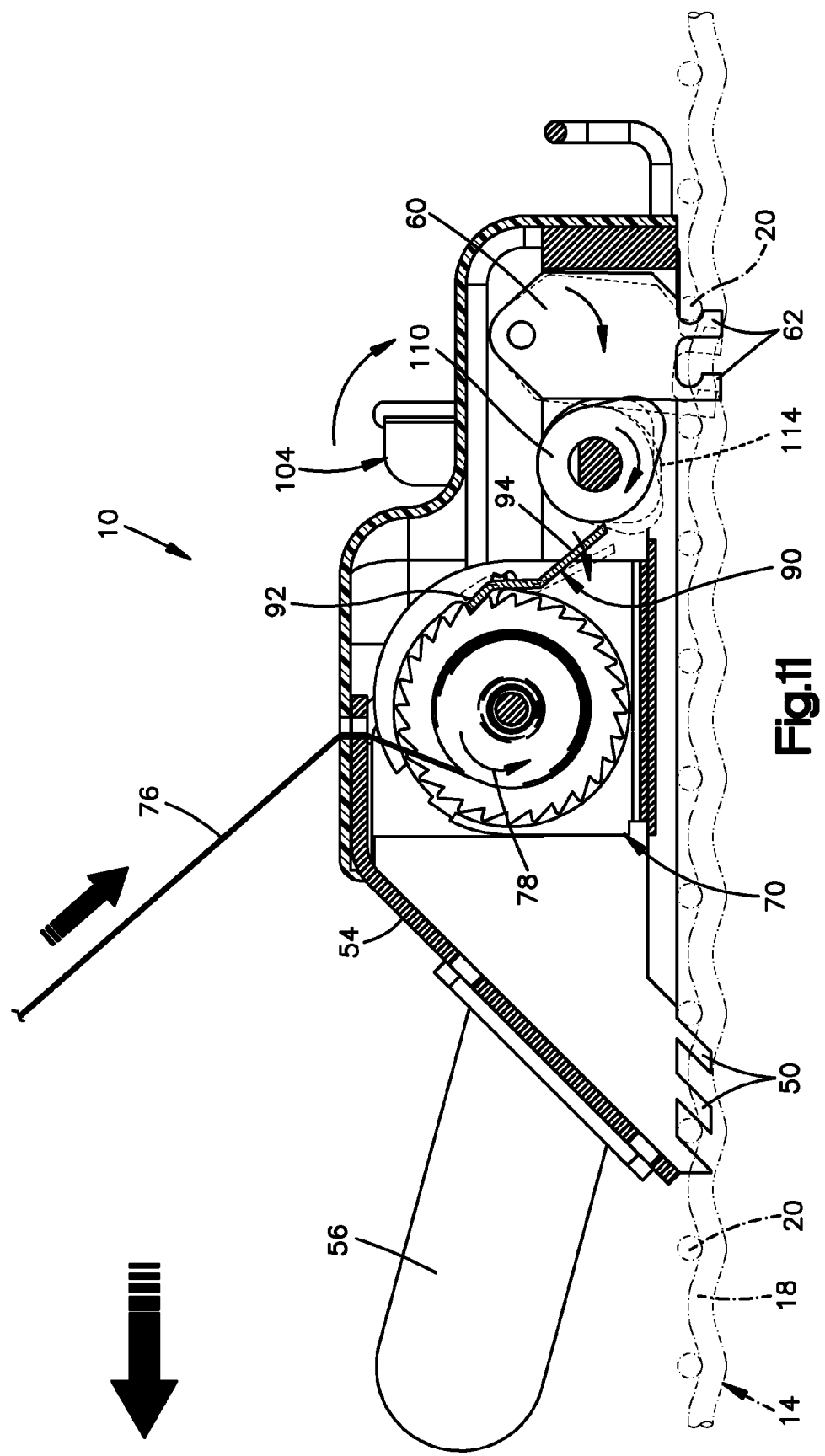
Figure 12:
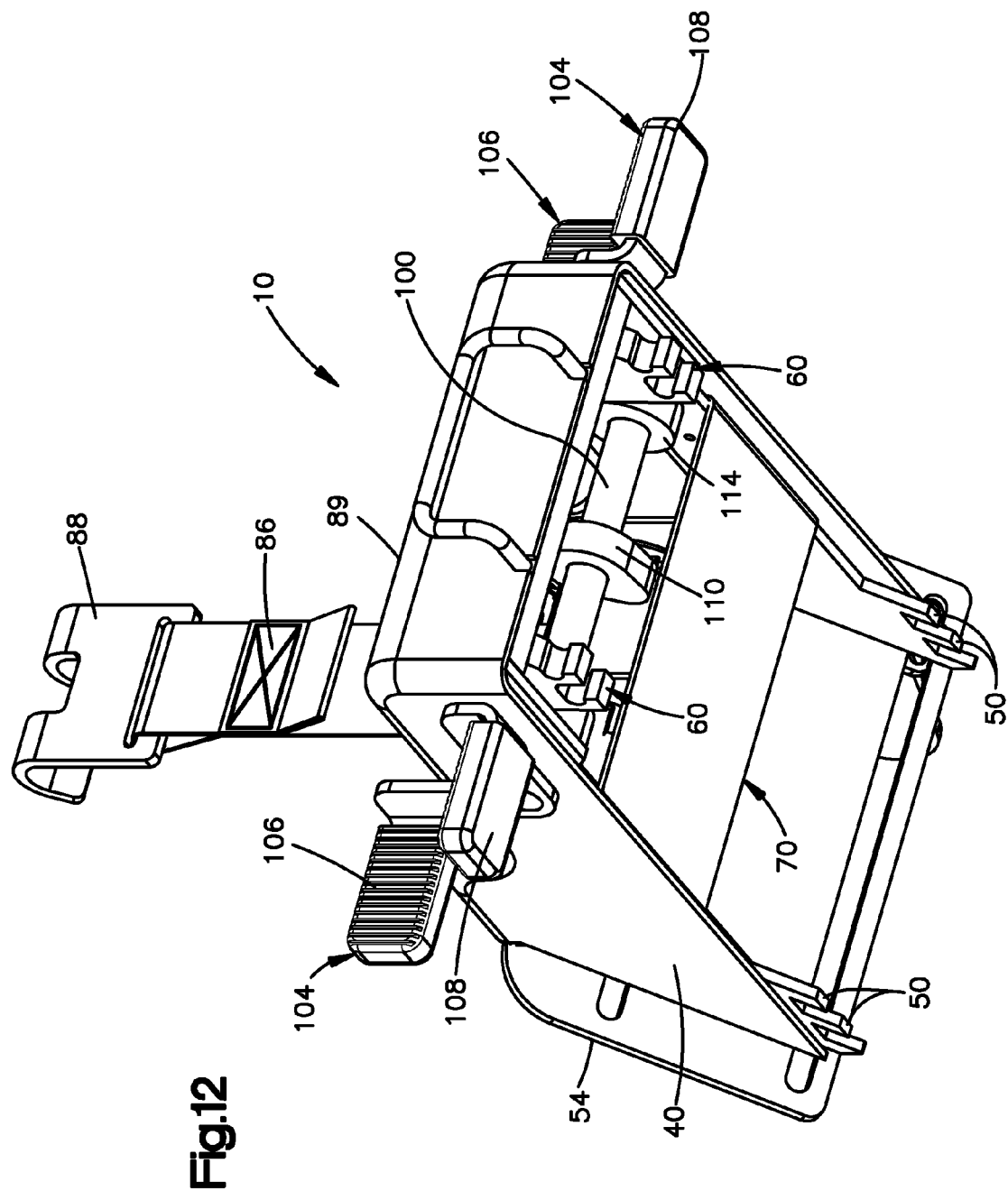
FIG. 12 is bottom rear perspective view of the wheel chock of FIG. 2.
Figure 13:
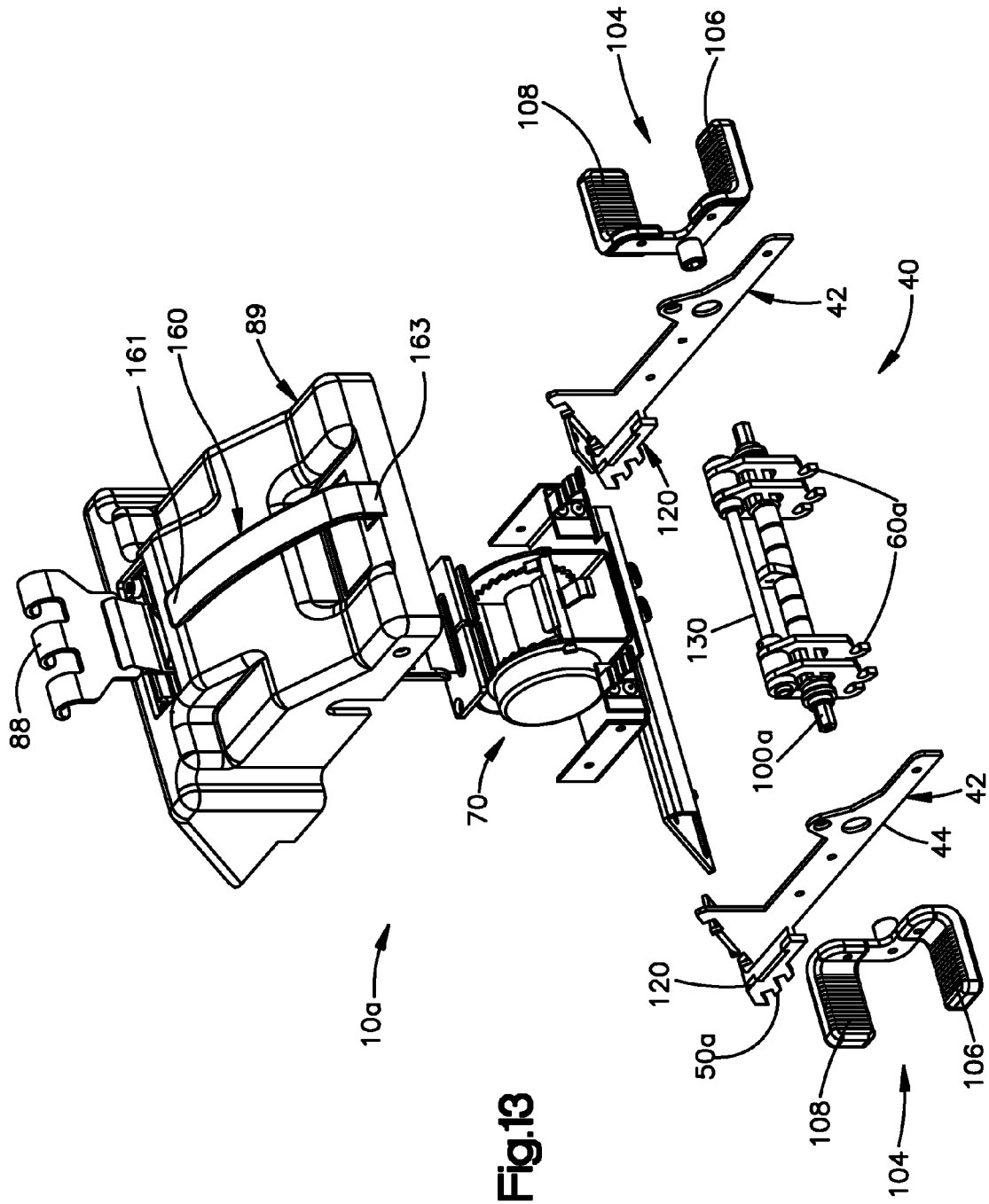
FIG. 13 is an exploded perspective view of a wheel chock that is a second embodiment of the invention.
Figure 14:
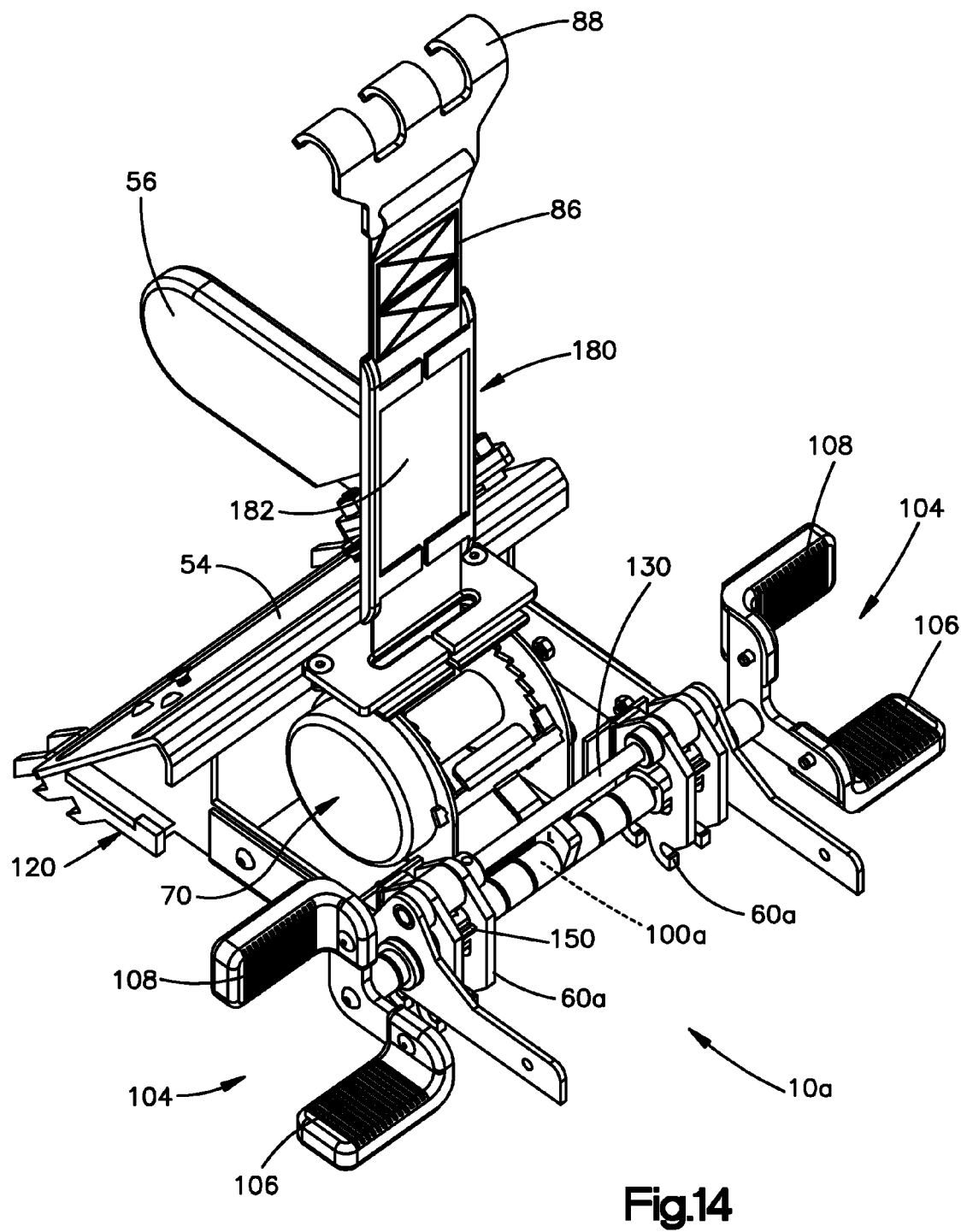
FIG. 14 is a perspective view of the wheel chock of FIG. 13 shown without its housing.

The chock 10 can then be unlocked and removed from the grating 14, as shown in FIG. 11, by reversing the movement of the paddle 104. This movement of the paddle 104 also has the effect of releasing the spool 74 for rotation in the strap withdrawal direction 80. The operator can extend the strap 76 from the spool 74 by a small amount sufficient to release the hook 86 from the grating 14. The operator can then allow the strap 76 to retract onto the spool 74. The strap 76 can be released in this manner, at any time, no matter how much force the vehicle tire 34 is placing on the ramp 54 of the chock 10, for example. The chock 10 thus provides "fail safe" unlatching or disengagement of the strap 76.

It should be understood that other changes and modifications are possible that fall within the scope of the invention. For example, without limitation, the chock could have a different design for the front teeth; could have a different design for the grate locks; and/or could have a different structure and operation for the locking and unlocking mechanism. In all such cases, the device could fall within the scope of the present invention.

As another example, the wheel chock with which the retractor and strap are associated could be similar to or identical to those shown in U.S. Pat. Nos. 5,312,213 and 5,302,063, or to products made under those patents by its owner.

Thus, as shown in FIG. 28, a marked-up copy of FIG. 5A of U.S. Pat. No. 5,302,063, the chock 12 includes a retractor 100 of the type described above with reference to FIGS. 1-12. The retractor 100 is suitably mounted, in a manner not shown, on the base of the chock 12. The retractor 100 includes a strap or length of strap 102 that extends from a spool and that can be extended around a vehicle tire which the wheel chock engages, in a manner as described above, to help secure the vehicle.

FIGS. 13-25 illustrate a wheel chock 10a that is another embodiment of the invention. Many parts of the wheel chock 10a are similar or identical, in function and/or structure, to corresponding parts of the wheel chock 10, and thus are given the same reference numerals with the suffix "a" added to distinguish them. Parts of the wheel chock 10a that are not specifically described herein can be assumed to be similar in function to the corresponding parts of the wheel chock 10.

In the wheel chock 10a, the front teeth are not formed as one piece with the cleats. Rather, each side rail (or cleat) 42 (FIG. 19) has a main body portion 48 on which is mounted a tooth assembly 120. The tooth assembly 120 in the illustrated embodiment includes three separate metal pieces 122, 124 and 126 (FIGS. 19 & 20) that are welded together in a generally U-shaped configuration to form the tooth assembly 120. The three piece assembly 120 can be easier to manufacture than stamping and bending a one-piece unit, although that is a possibility for the invention also. Tabs (or other projecting portions) and notches (or other recesses) on the several pieces 122-126 may be used to position them relative to each other prior to their being welded together into one unit. This unit 120 is then fitted into a recess or notch 128 in the side rail main body portion 48 and is welded to the side rail 42.

In the illustrated embodiment, each side piece of each tooth assembly 120 includes at least two, and preferably three or more, teeth 50a, spaced apart in a front to back direction by a distance selected so that two sets of teeth fit within one opening 22 of the grating 14 to resist forward movement of the chock 10a. More or fewer teeth 50a can be provided, and at different locations. In addition, on each tooth assembly 120 the front teeth 50a are arranged in several side by side pairs, so as to fit more closely within the grating openings and resist pivoting movement of the front end portion of the chock 10a about a vertical axis.

Each front tooth 50a extends downwardly and forwardly adjacent the front end of the base 40. Each front tooth 50a has a generally parallelogram-shaped configuration. The front teeth 50a are separated at their upper ends by a straight edge 52a of the tooth assembly 120, and, as illustrated, include no arcuate portions or edges.

In the wheel chock 10a, the grate locks 60a are also different, in number and configuration, from the grate locks of the wheel chock 10 shown in FIGS. 1-12. Specifically, the wheel chock 10a has a base 40 that includes, as a support member for the grate locks 60a, an upper cross bar 130. The upper cross bar 130 extends laterally across the base between the first and second side rails 42. The upper cross bar 130 (FIG. 15) has a circular cross-sectional configuration with a longitudinal central axis 132.

In the illustrated embodiment, four grate locks 60a are included, two on each side of the chock 10a. More or fewer grate locks 60a can be provided. Each grate lock 60a has an upper end portion 134 through which the upper cross bar 130 extends. The upper cross bar 130 supports the grate locks 60a for pivotal movement relative to the base 40 about the longitudinal central axis 132 of the upper cross bar 130.

Each grate lock 60a has a lower end portion 136 with two rearwardly extending hooks 62a spaced apart in a front to back direction by half the distance between adjacent cross wires 20 of the grating 14. Each grate lock 60a also includes a central cam opening 138 defined by a cam surface 140.

The wheel chock 10a also includes a lower cross bar, or shaft, 100a. The shaft 100a extends laterally across the base 40 between the first and second side rails 42 and is supported on the side rails 42 for rotational movement relative to the base 40 about a longitudinal central axis 144 of the shaft.

Figure 15:
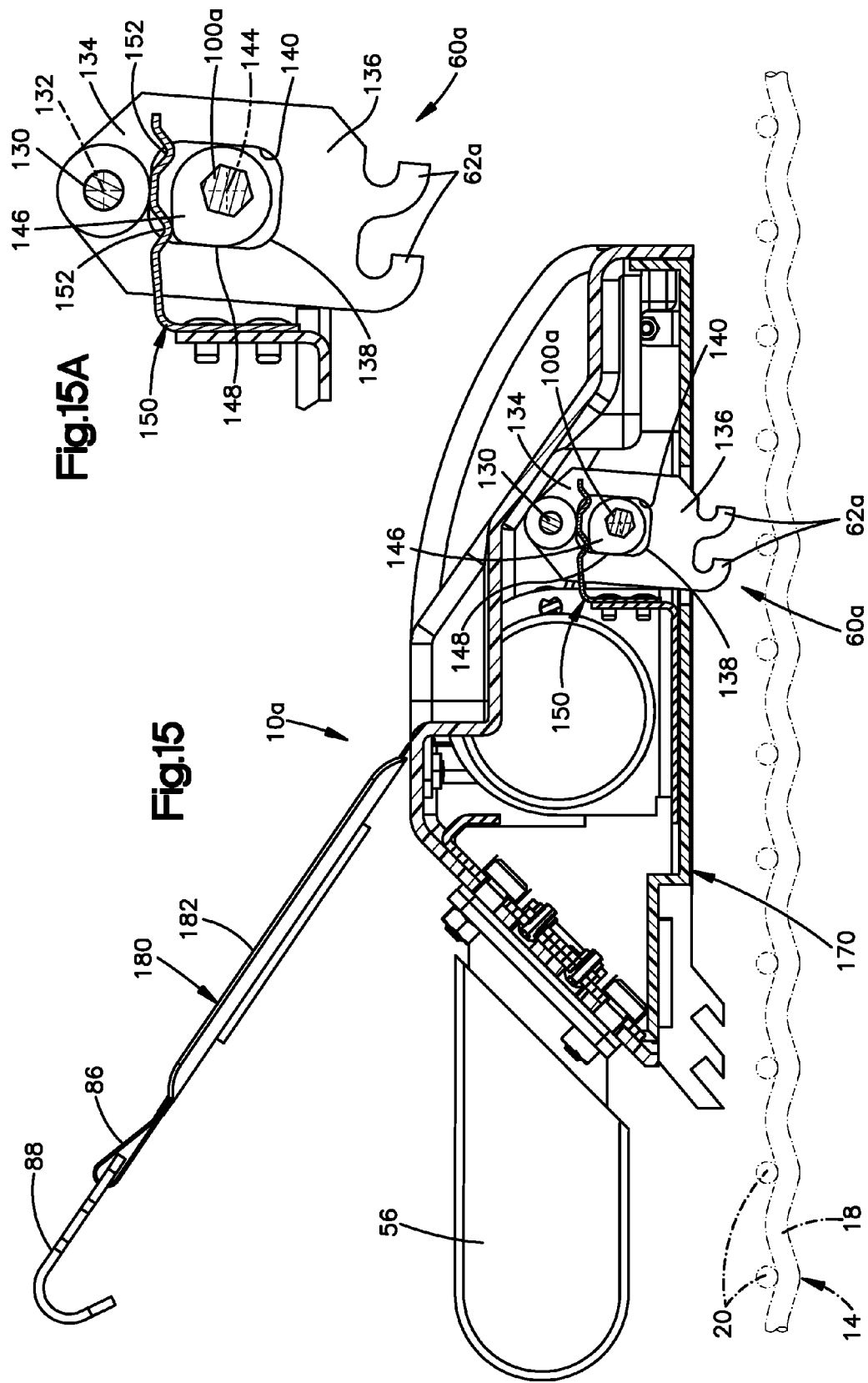
FIG. 15 is a side sectional view of the wheel chock of FIG. 13, showing a first step in the process of mounting the wheel chock on the grating.
Figure 16:
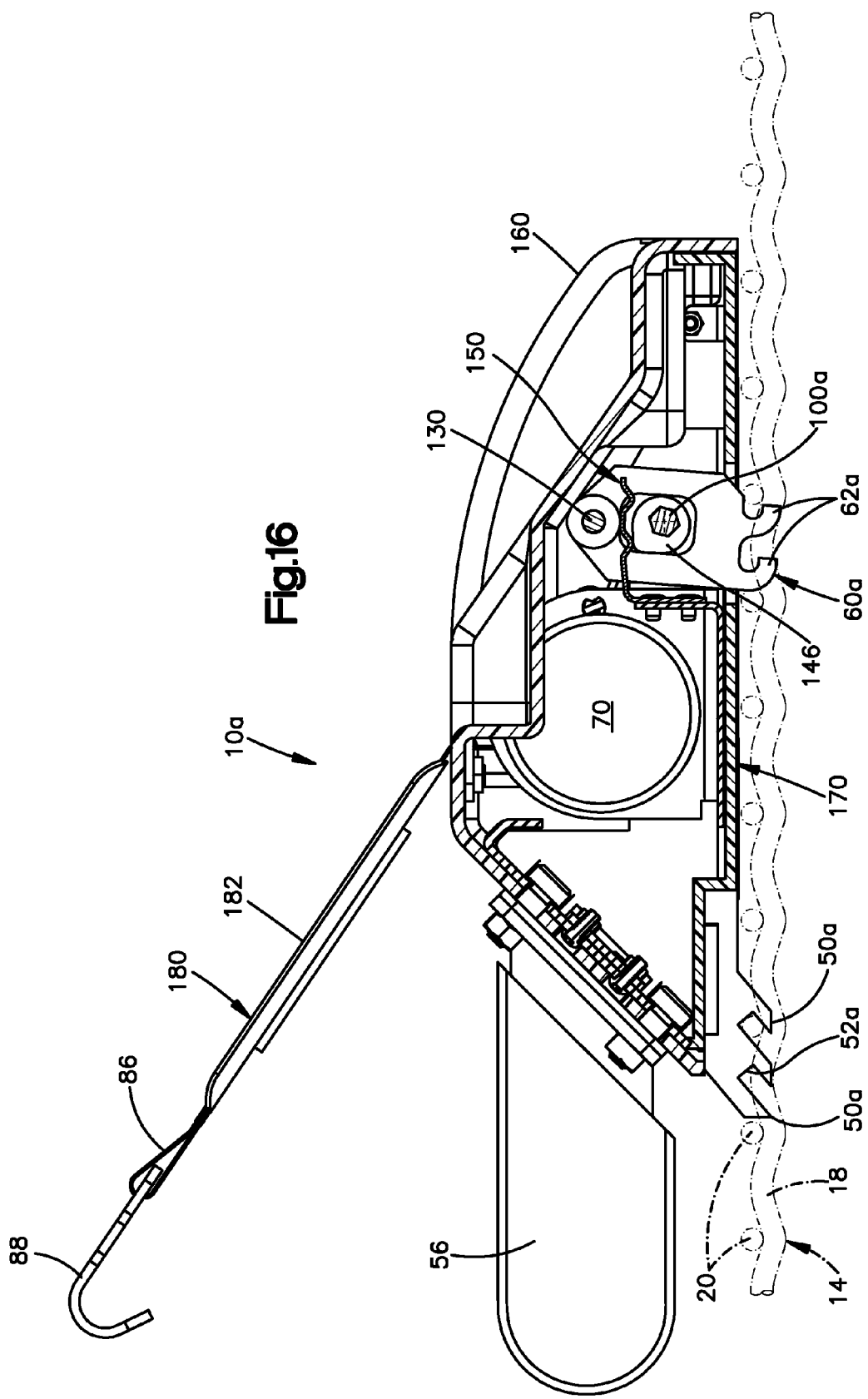
FIGS. 16 and 17 are side sectional views of the wheel chock of FIG. 13, showing additional steps in the process of mounting the wheel chock on the grating.
Figure 17:
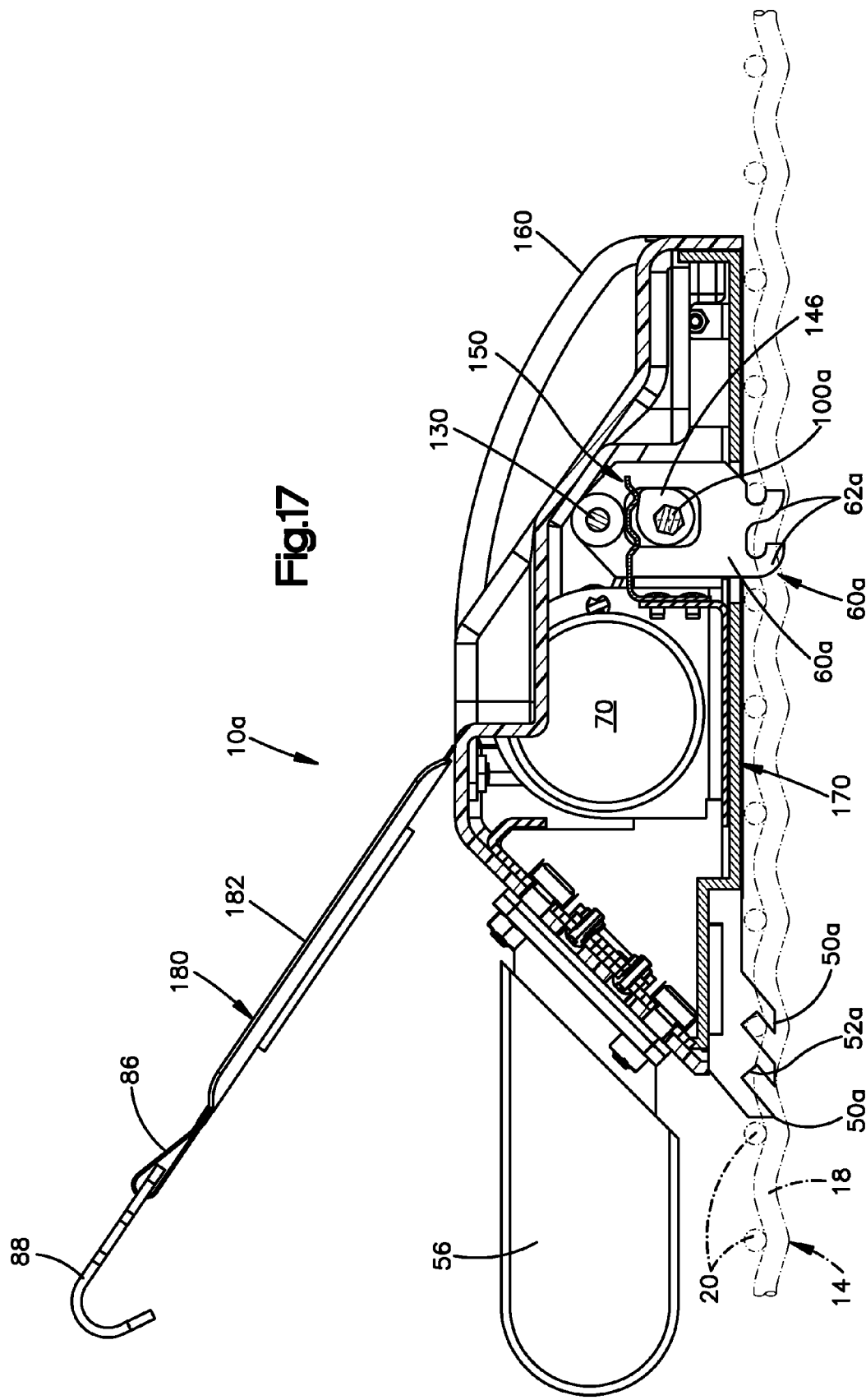

The grate locks 60a are movable, as described below, upon rotation of the shaft 100a, between a first or unlocked position as shown in FIGS. 15 and 16, in which the hooks 62a of the grate locks do not extend under a cross-wire 20 of the grating 14; and a second or locked position as shown in FIG. 17, in which one hook 62a of each grate lock extends under a cross-wire of the grating to lock the wheel chock 10a to the grating to resist rearward and upward movement of the wheel chock.

The shaft 100a extends through the central cam openings 138 of all the grate locks 60a. A plurality of grate locking cams 146 are fixedly mounted on the shaft 100a for rotation with the shaft. The cams 146 are located in the cam openings 138 of the grate locks 60a; in the illustrated embodiment, there is one cam associated with each side's pair of grate locks. The cams 146 have external camming surfaces 148 that are in engagement with the internal cam surfaces 140 of the grate locks 60a, and that are configured to cause the grate locks to pivot in an over center manner when the cams rotate, as described below.

A cam holder 150 is associated with each cam 146. The cam holders 150 help to hold the cams 146 in either the locked or unlocked position, 90 degrees apart, to prevent vibration or other forces from unintentionally rotating the shaft 100a and the cams. In the illustrated embodiment, the cam holders 150 are leaf springs. Each leaf spring has two V-shaped ridges 152 that ride on the cams 146. The engagement of the leaf spring ridges 152 with the cams 146 holds the cams in the locked and unlocked positions against vibration. The engagement of the leaf spring ridges 152 with the cams 146 can be overcome by foot force on the pedals but not by vibration or other unintentional means encountered in normal use.

The shaft 100a also supports two paddles 104 for rotation with the shaft and thus with the cams 146. The two paddles 104 are mounted at the opposite ends of the shaft 100a. The paddles 104 are on the sides of the chock 10a so as to be engageable by a foot or hand of an operator on either side of the wheel chock.

Each paddle 104 has a generally 90° L-shaped configuration including a first or red arm 106 and a second or green arm 108 at 90° from the first arm. The arms 106 and 108 are color-coded to show at a glance, as described below in detail, the locked or unlocked condition of the chock 10a.

The shaft 100a is rotatable through a 90° range of motion about its axis 144 so that one or the other of the arms 106 and 108 is upright. Because there is a paddle 104 on either end of the shaft 100a, and because the lateral restraint 56 can be positioned at either side, the chock 10a can be used on any one of the four tires of the vehicle 12, for example as shown in FIG. 1.

The chock 10a also includes a strap to tire locking feature 180 to resist lateral movement (sliding) of the strap 76 off the crown of the tire. The structure and operation of the locking feature 180 are discussed below in detail, after the following description of the operation of the wheel chock.

Operation of the wheel chock 10a is similar to, but not identical to, operation of the wheel chock 10. FIG. 15 illustrates the wheel chock 10a in the unlocked position, disposed above the grating 14 and ready to be moved down into engagement with the grating. The red arms 106 of the paddles 104 (seen in FIGS. 13 and 14) are up, showing that the grate locks 60a are in their unlocked position. The strap 76 is wound on the spool 74.

A position of the chock 10a on the grating 14 is selected so that the ramp 54 is under the tire to be blocked, while the lateral restraint 56, when slid fully sideways into the proper position on the chock (FIG. 3), is on the interior sidewall of the tire. The front end of the chock 10a is moved into such a position, in engagement with the grating 14, so that the front teeth 50a of the chock 10a engage a cross wire 20 of the grating 14. Specifically, at least two front teeth 50a on each side of the chock 10a slide forward and under the cross wire 20 to help to position and lock the front end of the chock onto the grating 14.

The back end of the chock 10a is then moved down into engagement with the grating 14, as shown in FIG. 16. Specifically, the back end of the base 40 is pivoted down onto the grating 14. The positioning of the grate locks 60a on the base 40 is such that the hooks 62a of the grate locks extend into openings 22 of the grating. Because the grate locks 60a are in their unlocked position, the hooks 62a do not extend under any cross-wires 20 of the grating 14.

Then, the paddle 104 can be rotated by about 45 degrees, so that the peaks of the cams 146 fall between the ridges 152 on the leaf springs 150. The grate locks 60a pivot enough so that their tips engage under the grating 14, enough to keep the back end of the wheel chock 10a from lifting off the grating under force applied by the strap when it is being extended around the tire. The engagement of the leaf springs 150 with the cams 146 is strong enough to hold the shaft 100a and the parts connected therewith in this intermediate position.

Next, the operator extends the strap 76 of the retractor 70 over the associated vehicle tire 34, as shown in FIGS. 2 and 3. The operator can grasp the terminal end 86 of the strap 76 and pull it out far enough to extend over the vehicle tire 34. The operator engages the hook 88 with the grating 14 on the side of the tire 34 opposite the chock 10a. When the strap 76 is thereafter released, slack in the strap is taken up by the retractor 70. The strap to tire locking feature 180 may be set, as described below.

Next, the chock 10a is locked to the grating 14, as shown in FIG. 17. The operator turns the paddles 104 by the remaining 45° (in a clockwise direction as viewed in FIG. 17). As a result, the shaft 100a turns in that same direction, carrying with it the grate locking cams 146.

When the grate locking cams 146 turn, they rotate from the position shown in FIG. 16, to the position shown in FIG. 17. As this movement occurs, the camming surfaces 148 on the cams 146 engage the cam surfaces 140 on the grate locks 60a, and cause the grate locks to pivot in an over center manner to the engaged, or locked, position shown in FIG. 17. In this position, the hooks 62a on the grate locks 60a extend rearward beneath the cross-wire 20 of the grating 14, thus positioning and firmly locking the back end of the chock 10a to the grating. The leaf spring 150 helps to hold the parts in this position.

The camming surfaces 148 on the cams 146 are in abutting engagement with the cam surfaces 140 on the grate locks 62a, at all times. As a result, there is positive engagement and rotation of the grate locks 62a in both directions, from unlocked to locked, and from locked to unlocked, upon cam rotation. The mechanism does not need to rely on springs to rotate the grate locks 60a from the locked position back to the unlocked position.

When the wheel chock 10a is locked, the green arms 108 of the paddles 104 move to the up position, indicating a locked condition of the chock 10a. The color coding of the arms of the paddles 104 can be used by the operator to determine visually whether the wheel chocks are locked or unlocked.

The chock 10a includes a handle 160 for carrying and positioning the chock. The handle 160 is mounted on the outside of the cover 89. A first end of the handle 160 is secured to the cover 89, and/or to the underlying structure of the chock 10a, at a location 161. An opposite second end of the handle 160 is secured to the cover 89, and/or to the underlying structure of the chock 10a, at a location 163.

The chock 10a also includes a bottom plate or bottom cover 170 (FIGS. 15 and 18). The bottom plate 170 is mounted to the chock 10a to cover the bottom of the chock. The bottom plate 170 is configured to cover substantially all of the underside of the chock 10a, except for cutouts for the grate locks 60a. The bottom plate 170 may be made from plastic.

The bottom plate 170 may be held on the chock 10a by any suitable means. For example, the front portion of the bottom plate 170 may be held on by the front tooth assembly 120, and the back portion of the bottom plate may be held on by screws or other fasteners. The bottom plate 170, like the cover, helps to protect the components of the chock 10a from impacts, and from the entry of debris and other material, such as water or moisture. The cutouts for the grate locks 60a allow for drainage of water from the chock 10a.

As noted above, the chock 10a may optionally include a strap to tire locking feature 180, to resist lateral (sliding) movement of the strap off the crown 178 (FIG. 25) of the tire 34. The locking feature 180 can take various different forms; two such forms are illustrated herein.

In the embodiment shown in FIGS. 21 and 25, the locking feature 180 includes a grip or slider 182 on the strap 76. The slider 182 is slidable along the length of the strap 76. The slider 182 has one or more engagement features on its side facing the tire tread. The engagement features may be ribs 184 as shown, or may be dots or other features.

In use, the operator positions the slider 182 (FIG. 25) at the crown (high point and centered laterally) 178 of the tire, prior to allowing the retractor 70 to lock. Then, when the retractor is locked, the engagement features 184 on the slider 182 engage the tire tread. This engagement prevents the slider 182 from sliding laterally off the tire. Because the slider 182 is mounted on the strap 76, the strap is also prevented from sliding laterally off the tire.

In the embodiment shown in FIGS. 22-24, the locking feature 180 is formed directly on the strap 76 and is movable with the strap. For example, the locking feature may be a grip 190 formed by deposition of a plastic material, such as Plastisol, on the side surface of the strap that contacts the tire tread. The grip 190 could be formed as dots of material 192, similar to those found on some gloves or shoes.

The spacing of the dots 192 on the strap 76 can be random or in a pattern. It is only necessary for a few of the dots 192 to fall into grooves in the tire tread, in order for the grip 190 to satisfactorily engage the tire tread and prevent lateral movement of the strap across the tire.

The length of the grip 190 along the strap 76 is selected to provide satisfactory grip for both the smallest tire to be secured and the largest tire to be secured. One method of determining the length and location of the grip 190 is as follows.

The location of the beginning of the grip 190 (i.e., the end closer to the hook 88) can be determined by extending the strap 76 around the smallest tire (FIG. 23) and hooking the hook into the grating 14. The grip 190 can start a small distance 194, for example four inches, from the crown 178 of the tire. This sets the beginning point for the grip 190.

Then, the strap 76 can be extended around the largest tire to be secured (FIG. 24). A point of the grip 190 is then marked at a small distance 196, for example four inches, past the tire crown 178 (in a direction toward the chock 10a). This sets the ending point of the grip 190. Thus for any tire the grip 190 will cover the crown and at least four inches out in each direction.

Figure 26:
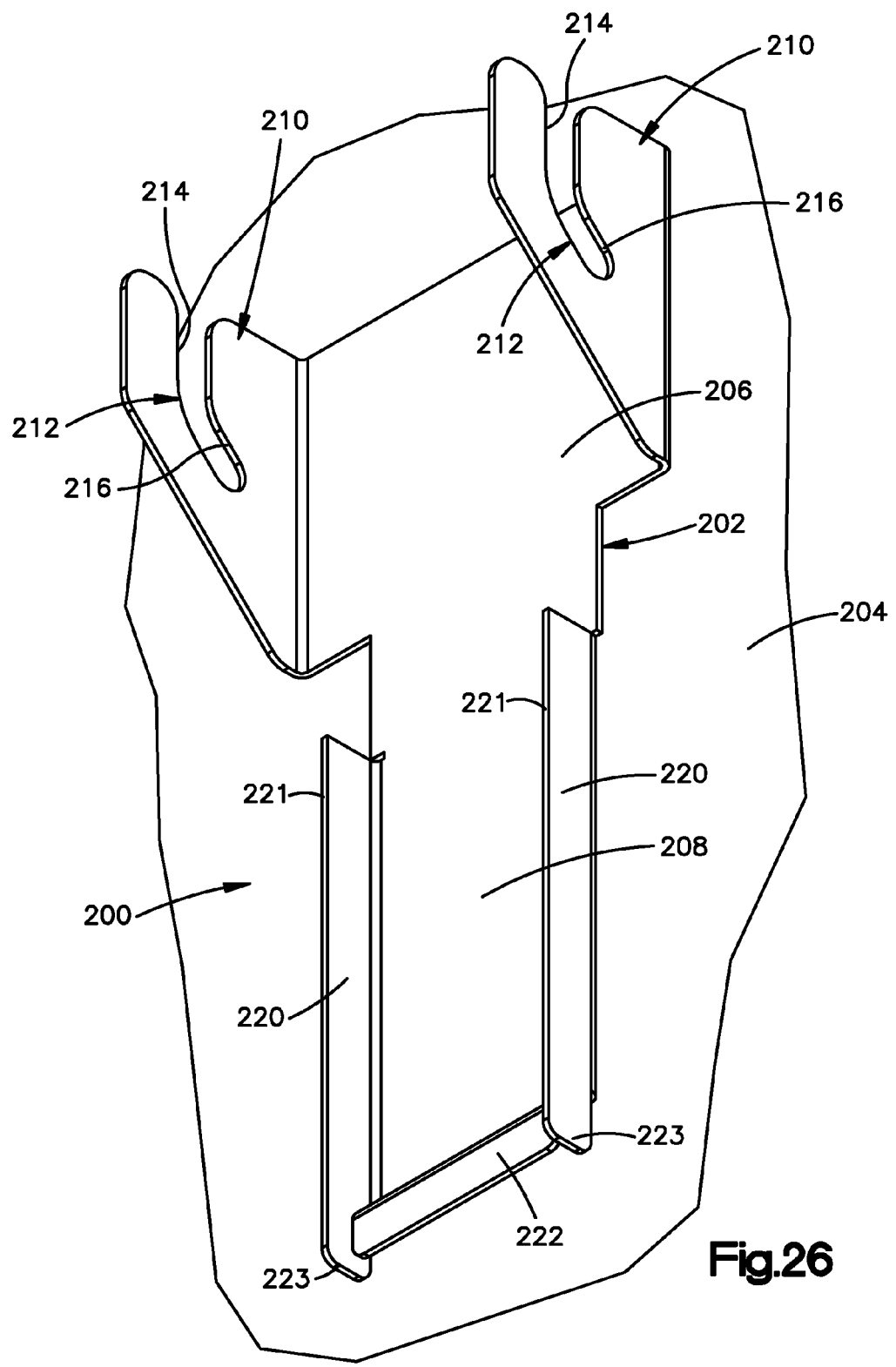
FIG. 26 is a perspective view illustrating a wall plate for supporting a wheel chock, when not in use, on a wall.

As noted above, the invention also relates to a wall mount for a wheel chock, and to a system or apparatus that includes one or more wall mounts and one or more wheel chocks. FIGS. 26 and 27 illustrate one example of a wall mount 200 that can be used with a wheel chock 10 or 10a of the present invention. The wall mount 200 is shown alone in FIG. 26, and in FIG. 27 is shown supporting, as one example, the wheel chock 10a. The wall mount 200 may be made from either plastic or metal.

The wall mount 200 includes a base wall 202 that is adapted to lie against a vertical wall surface 204. The base wall 202 includes an upper end portion 206 and a lower end portion 208. The wall mount 200 may be secured to the wall 204 with suitable fasteners (not shown) through the base wall 202, or in any other suitable manner.

The wall mount 200 includes two additional flanges 210 that project from the upper end portion 206 of the base wall 202 in a direction perpendicular to the supporting wall surface 204. Each support flange 210 includes a slot 212 having a first portion 214 extending parallel to the plane of the base wall 202 and a second portion 216 extending at an angle in toward the base wall 202. The spacing between the support flanges 210 is selected to be substantially the same as the spacing between the projecting ends of the shaft 100a of the wheel chock 10a, just inboard of the paddles 104 and outboard of the side rails 42.

The wall mount 200 includes two other flanges 220 that project from the lower end portion 208 of the base wall 202 in a direction away from the supporting wall surface 204. The flanges 220 have upper edges 221. A hook mounting flange 222 extends across the width of the wall mount lower end portion 208, between the lower end portions 223 of the flanges 220. The lateral spacing between the flanges 220 is selected to be substantially the same as the spacing between the tooth assemblies 120 of the wheel chock 10a. The height of the flanges 220, off the base wall 202, is selected to be greater than the distance by which the tooth assemblies 120 of the wheel chock project from the bottom cover 170.

In use, the wall mount 200 is fixed in a vertical or generally vertical orientation. The wheel chock 10a (or 10) is lifted into position on the wall mount 200, for example by use of the handle 160. The projecting ends of the shaft 100a of the wheel chock 10a, just inboard of the paddles 104 and outboard of the side rails 42, are placed in the vertical portions 214 of the slots 212 in the support flanges 210 on the upper end portion 206 of the base wall 202. The wheel chock 10a is moved or allowed to slide downward so that the shaft 100a moves into, and to the lower ends of, the angled portions 216 of the slots 212. The bottom cover 170 of the wheel chock 10a engages and rests on the edges 221 of the flanges 220.

In this position, the weight of the wheel chock 10a resists upward movement of the wheel chock on the wall mount 200. The support flanges 210 of the wall mount 200 resist lateral movement of the upper portion of the wheel chock 10a. The tooth assemblies 120 lie adjacent to the flanges 220 to further resist lateral movement of the wheel chock 10a. As a result, the wheel chock 10a is securely positioned on the wall mount 200 and thus on the wall surface 204. In addition, the flanges 220 hold the tooth assemblies 120 of the wheel chock off the wall surface 204, thus preventing damage to the teeth 50a.

The hook mounting flange 222 of the wall mount 200 can be used to secure a hook 88 of the wheel chock 10a, as shown in FIG. 27. This feature can be especially useful if the wheel chock strap 76 includes a grip or slider that prevents all the strap from retracting into the retractor. In such a case, engaging the hook 88 with the hook mounting flange 222 can prevent the hook from swinging around during transport when the wheel chock 10a is not in use.

This application discloses various embodiments of wheel chocks, having various different features. A wheel chock in accordance with the invention may include one feature or any combination of the features.

The invention claimed is:

1. A wheel chock for restraining movement of a vehicle tire on a supporting grating during transit, the wheel chock comprising:
 a base to be locked to the grating during transit;
 a strap connected with the base and extensible around the vehicle tire to help restrain movement of the tire on the grating; and
 a retractor for retracting the strap and for taking up slack that forms in the strap during transit;
 including a manually actuatable grate lock mechanism for locking the base to the grating, and wherein the retractor has a locking mechanism for blocking withdrawal of the strap from the retractor, the retractor locking mechanism being at least partially controlled by the grate lock mechanism.

2. A wheel chock as set forth in claim 1 wherein the retractor includes a biased spool and a locking pawl, and the retractor locking mechanism includes a retractor cam that rotates into a position in which it cooperates with the locking pawl to block rotation of the spool in a strap withdrawal direction.

3. A wheel chock as set forth in claim 1 wherein the strap is extensible circumferentially around a portion of the tire and has an end portion engageable with the grating at a location spaced from the base with the vehicle tire between the end portion and the base to help restrain movement of the tire.

4. A wheel chock as set forth in claim 3 wherein the strap end portion has a hook that engages the grating at a location spaced from the vehicle tire.

5. A wheel chock as set forth in claim 1 comprising:
 a lateral restraint on the base and selectively engageable with either the inside sidewall or the outside sidewall of the vehicle tire;
 the wheel chock having a front end for engagement with the vehicle tire and a back end and first and second opposite sides; and
 a manually engageable actuator for locking the base to the grating, the actuator being accessible from both the first and second opposite sides of the wheel chock.

6. A wheel chock as set forth in claim 5 wherein the lateral restraint is movable on the base between a first position on the first side of the wheel chock to engage an inside sidewall of the vehicle tire and a second position on the second side of the wheel chock to engage an outside sidewall of the vehicle tire.

7. Apparatus for restraining movement of a vehicle tire on a supporting grating during transit, including a wheel chock having first and second sides and comprising:
 a base;
 a grate lock mechanism for locking the base to the grating;
 a ramp on the base for engagement with a circumference of the vehicle tire;
 a lateral restraint on the base and selectively engageable with either the inside sidewall or the outside sidewall of the vehicle tire;
 a manually engageable actuator for actuating the grate lock mechanism, the actuator being accessible from both the first and second sides of the wheel chock;
 a strap connected with the base and extensible around the vehicle tire to help restrain movement of the tire on the grating; and
 a retractor for retracting the strap and for taking up slack that forms in the strap during transit.

8. Apparatus as set forth in claim 7 further comprising a wall mount for supporting the wheel chock on a wall, the wall mount including portions for engaging the wall and portions for supporting the wheel chock.

9. A wheel chock as set forth in claim 2 comprising:
 a lateral restraint on the base and selectively engageable with either the inside sidewall or the outside sidewall of the vehicle tire;
 the wheel chock having a front end for engagement with the vehicle tire and a back end and first and second opposite sides; and
 the manually engageable actuator for locking the base to the grating, the actuator being accessible from both the first and second opposite sides of the wheel chock.

* * * * *